United States Patent
Unger et al.

(10) Patent No.: US 7,760,879 B2
(45) Date of Patent: *Jul. 20, 2010

(54) MULTIPLE PARTIAL ENCRYPTION

(75) Inventors: Robert Allan Unger, El Cajon, CA (US); Brant L. Candelore, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 271 days.

This patent is subject to a terminal disclaimer.

(21) Appl. No.: 11/983,296

(22) Filed: Nov. 8, 2007

(65) Prior Publication Data

US 2008/0267400 A1    Oct. 30, 2008

Related U.S. Application Data

(63) Continuation of application No. 10/038,217, filed on Jan. 2, 2002, now Pat. No. 7,336,787.

(60) Provisional application No. 60/296,673, filed on Jun. 6, 2001, provisional application No. 60/304,241, filed on Jul. 10, 2001, provisional application No. 60/304,131, filed on Jul. 10, 2001, provisional application No. 60/343,710, filed on Oct. 26, 2001.

(51) Int. Cl.
*H04N 7/167* (2006.01)
*H04N 7/16* (2006.01)
*H04N 7/173* (2006.01)
*G06F 12/14* (2006.01)
*G06F 21/00* (2006.01)

(52) U.S. Cl. .............. 380/217; 380/200; 380/201; 380/210; 713/189; 713/193; 705/57; 705/58; 705/59; 725/25; 725/31; 725/87

(58) Field of Classification Search ............ 380/217
See application file for complete search history.

(56) References Cited

U.S. PATENT DOCUMENTS 4,374,399 A * 2/1983 Ensinger ................ 348/466
4,881,263 A * 11/1989 Herbison et al. ........... 713/162

(Continued)

FOREIGN PATENT DOCUMENTS

CA    2389247    5/2001

(Continued)

OTHER PUBLICATIONS

All references cited in the parent application, U.S. Appl. No. 10/038,217, filed Jan. 2, 2002.

(Continued)

*Primary Examiner*—Aravind K Moorthy
(74) *Attorney, Agent, or Firm*—Miller Patent Services; Jerry A. Miller

(57) ABSTRACT

A method of encrypting a digital television signal carried out in any operative order involves duplicating packets in the digital television signal so as to create first and second duplicate packets; encrypting the first duplicate packets according to a first encryption method to create first encrypted packets; encrypting the second duplicate packets according to a second encryption method to create second encrypted packets; identifying packets in the digital television signal that are of a packet type, while other packets are not of the packet type; replacing the identified packets in the digital television signal with corresponding first and second encrypted packets to produce a multiple partially encrypted digital television signal comprising the other packets that are unencrypted and the first and second encrypted packets; and distributing the multiple partially encrypted digital television signal. This abstract is not to be considered limiting as other embodiments may include more or fewer or differing elements than appear in the abstract.

25 Claims, 16 Drawing Sheets

U.S. PATENT DOCUMENTS

| | | | |
|---|---|---|---|
| 4,964,126 A | 10/1990 | Musicus et al. | |
| 5,195,135 A | 3/1993 | Palmer | |
| 5,477,263 A | 12/1995 | O'Callaghan et al. | |
| 5,515,107 A | 5/1996 | Chiang et al. | |
| 5,594,507 A | 1/1997 | Hoarty | |
| 5,600,378 A | 2/1997 | Wasilewski | |
| 5,629,866 A | 5/1997 | Carrubba et al. | |
| 5,652,615 A | 7/1997 | Bryant et al. | |
| 5,761,180 A | 6/1998 | Murabayashi et al. | |
| 5,835,668 A | 11/1998 | Yanagihara | |
| 5,838,873 A | 11/1998 | Blatter et al. | |
| 5,892,900 A | 4/1999 | Ginter et al. | |
| 5,905,732 A | 5/1999 | Fimoff et al. | |
| 5,920,626 A | 7/1999 | Durden et al. | |
| 5,943,605 A | 8/1999 | Koepele, Jr. | |
| 6,005,940 A | 12/1999 | Kulinets | |
| 6,057,832 A | 5/2000 | Lev et al. | |
| 6,064,676 A | 5/2000 | Slattery et al. | |
| 6,170,075 B1 | 1/2001 | Schuster et al. | |
| 6,181,364 B1 | 1/2001 | Ford | |
| 6,201,927 B1 | 3/2001 | Comer | |
| 6,219,358 B1 | 4/2001 | Pinder et al. | |
| 6,226,385 B1* | 5/2001 | Taguchi et al. | 380/283 |
| 6,314,111 B1 | 11/2001 | Nandikonda et al. | |
| 6,327,421 B1 | 12/2001 | Tiwari et al. | |
| 6,337,947 B1 | 1/2002 | Porter et al. | |
| 6,453,116 B1 | 9/2002 | Ando et al. | |
| 6,473,459 B1 | 10/2002 | Sugano et al. | |
| 6,480,551 B1 | 11/2002 | Ohishi et al. | |
| 6,490,728 B1 | 12/2002 | Kitazato et al. | |
| 6,621,866 B1 | 9/2003 | Florencio et al. | |
| 6,621,979 B1 | 9/2003 | Eerenberg et al. | |
| 6,643,298 B1 | 11/2003 | Brunheroto et al. | |
| 6,697,489 B1 | 2/2004 | Candelore | |
| 6,701,258 B2 | 3/2004 | Kramb et al. | |
| 6,741,795 B1* | 5/2004 | Takehiko et al. | 386/95 |
| 6,853,728 B1 | 2/2005 | Kahn et al. | |
| 6,925,180 B2 | 8/2005 | Iwamura | |
| 6,988,238 B1 | 1/2006 | Kovacevic et al. | |
| 7,055,166 B1 | 5/2006 | Logan et al. | |
| 7,079,752 B1 | 7/2006 | Leyendecker | |
| 7,089,579 B1 | 8/2006 | Mao et al. | |
| 7,096,487 B1 | 8/2006 | Gordon et al. | |
| 7,110,659 B2 | 9/2006 | Fujie et al. | |
| 7,124,303 B2* | 10/2006 | Candelore et al. | 713/193 |
| 7,139,398 B2 | 11/2006 | Candelore et al. | |
| 7,158,185 B2 | 1/2007 | Gastaldi | |
| 7,194,758 B1 | 3/2007 | Waki et al. | |
| 7,221,706 B2 | 5/2007 | Zhao et al. | |
| 7,292,692 B2 | 11/2007 | Bonan et al. | |
| 7,298,959 B1* | 11/2007 | Hallberg et al. | 386/46 |
| 7,336,785 B1 | 2/2008 | Lu et al. | |
| 7,391,866 B2 | 6/2008 | Fukami et al. | |
| 7,508,454 B1 | 3/2009 | Vantalon et al. | |
| 2001/0013123 A1 | 8/2001 | Freeman et al. | |
| 2002/0044558 A1 | 4/2002 | Gobbi et al. | |
| 2002/0056093 A1 | 5/2002 | Kunkel et al. | |
| 2002/0067436 A1 | 6/2002 | Shirahama et al. | |
| 2002/0083439 A1 | 6/2002 | Eldering | |
| 2002/0100054 A1 | 7/2002 | Feinberg et al. | |
| 2002/0109707 A1 | 8/2002 | Lao et al. | |
| 2002/0144116 A1 | 10/2002 | Giobbi | |
| 2002/0157115 A1 | 10/2002 | Lu | |
| 2002/0194589 A1 | 12/2002 | Cristofalo et al. | |
| 2003/0021412 A1 | 1/2003 | Candelore et al. | |
| 2003/0026423 A1 | 2/2003 | Unger et al. | |
| 2003/0034997 A1 | 2/2003 | McKain et al. | |
| 2003/0174837 A1 | 9/2003 | Candelore et al. | |
| 2004/0037421 A1 | 2/2004 | Truman | |
| 2004/0083117 A1 | 4/2004 | Chen et al. | |
| 2004/0168121 A1 | 8/2004 | Matz | |
| 2004/0264924 A1 | 12/2004 | Campisano et al. | |
| 2005/0015816 A1 | 1/2005 | Christofalo et al. | |
| 2005/0028193 A1 | 2/2005 | Candelore et al. | |
| 2005/0169473 A1* | 8/2005 | Candelore | 380/239 |
| 2005/0283797 A1 | 12/2005 | Eldering et al. | |
| 2006/0130121 A1 | 6/2006 | Candelore et al. | |
| 2007/0091886 A1 | 4/2007 | Davis et al. | |

FOREIGN PATENT DOCUMENTS

| | | |
|---|---|---|
| EP | 0 696 141 | 7/1995 |
| EP | 0720374 | 7/1996 |
| EP | 0382764 | 4/1997 |
| JP | 07-046575 | 2/1995 |
| KR | 299634 | 8/2008 |
| WO | WO 93/09525 | 5/1993 |
| WO | WO 94/13081 | 6/1994 |
| WO | WO 94/13107 | 6/1994 |
| WO | WO 95/28058 | 4/1995 |
| WO | WO 98/08341 | 2/1998 |
| WO | WO 00/31964 | 6/2000 |
| WO | WO 00/59203 | 10/2000 |
| WO | WO 00/60846 | 10/2000 |
| WO | WO 00/64164 | 10/2000 |
| WO | WO 00/70817 | 11/2000 |
| WO | WO 01/26372 | 4/2001 |
| WO | WO 01/67667 | 9/2001 |
| WO | WO 02/51096 | 6/2002 |

OTHER PUBLICATIONS

"How Networks Work" Derfler and Freed, Ziff-Davis Press, 1996.
"How Computers Work—Millennium Edition," Ron White, Que Corporation, 1999.
"How the Internet Works—Millennium Edition," Preston Gralla, Que Corporation, 1999.
"Desktop Encyclopedia of the Internet," Nathan J. Muller, Artech House, 1999.
"MPEG-2 Compliant Trick Play Over a Digital Interface," van Gassel et al., IEEE pp. 170-171., 2002.
"K-Time Encryption for K-Time Licensing," Perkins, et al., IEEE, 2002.
"Partial Encryption of Compressed Images and Videos," Howard Cheng et al. IEEE 2000.
"Secure Transmission of MPEG Video Sources," Teixeira et al., date unknown.
"MPEG-2 Transmission," Dr. Gorry Fairhurst, Jan. 2001.
"DVB Conditional Access," David Cutts, Electronics and Communication Engineering Journal, Feb. 1997.
Anonymous—Functional Model of a Condtional Access System; EBU Project Group B/CA, EBU Review Technical, Winter No. 266, Grand-Saconnex, CH; pp. 64-77; 1995.

* cited by examiner

MULTIPLE PARTIAL ENCRYPTION

CROSS REFERENCE TO RELATED DOCUMENTS

This application is a continuation of U.S. patent application Ser. No. 10/038,217 filed Jan. 2, 2002 now U.S Pat. No. 7,336,787 which claims priority of U.S. provisional patent application Ser. No. 60/296,673 filed Jun. 6, 2001 to Candelore, et al. entitled "Method for Allowing Multiple CA Providers to Interoperate in a Content Delivery System by Sending Video in the Clear for Some Content, and Dual Carriage of Audio and Dual Carriage of Video and Audio for Other Content", and provisional patent application Ser. No. 60/304,241 filed Jul. 10, 2001 to Unger et al., entitled "Independent Selective Encryptions of Program Content for Dual Carriage", and provisional patent application Ser. No. 60/304,131 filed Jul. 10, 2001 to Candelore et al., entitled "Method for Allowing Multiple CA Providers to Interoperate in a Content Delivery System by Partial Scrambling Content on a Time Slice Basis" and to U.S. provisional patent application Ser. No. 60/343,710, filed on Oct. 26, 2001 to Candelore et al., entitled "Television Encryption Systems", which are hereby incorporated herein by reference.

This application is also related to U.S. patent applications entitled "Time Division Partial Encryption" to Candelore et al., Ser. No. 10/038,032; entitled "Elementary Stream Partial Encryption" to Candelore et al., Ser. No. 10/037,914; entitled "Partial Encryption and PID Mapping" to Candelore et al., Ser. No. 10/037,499; and entitled "Decoding and Decrypting of Partially Encrypted Information" to Unger et al., Ser. No. 10/037,498. These simultaneously filed patent applications are hereby incorporated by reference herein.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

This invention relates generally to the field of encryption systems. More particularly, this invention relates to systems, methods and apparatus for providing partial encryption and decryption of digital of television signals.

BACKGROUND OF THE INVENTION

Television is used to deliver entertainment and education to viewers. The source material (audio, video, etc.) is multiplexed into a combined signal which is then used to modulate a carrier. This carrier is commonly known as a channel. (A typical channel can carry one analog program, one or two high definition (HD) digital program(s), or several (e.g. nine) standard definition digital programs.) In a terrestrial system, these channels correspond to government assigned frequencies and are distributed over the air. The program is delivered to a receiver that has a tuner that pulls the signal from the air and delivers it to a demodulator, which in turn provides video to a display and audio to speakers. In a cable system the modulated channels are carried over a cable. There may also be an in-band or out-of-band feed of a program guide indicating what programs are available and the associated tuning information. The number of cable channels is finite and limited by equipment/cable bandwidth. Cable distribution systems require a significant capital investment and are expensive to upgrade.

Much of television content is valuable to its producers, therefore copyright holders want to control access and restrict copies. Examples of typically protected material include feature films, sporting events, and adult programming. Conditional access (CA) systems are used to control availability of programming in content delivery systems such as cable systems. CA systems come as matched sets—one part is integrated into the cable system headend and encrypts premium content, the other part provides decryption and is built into the set-top boxes (STB) installed in user's homes. Several CA systems are used in the cable industry including those provided by NDS (Newport Beach, Calif.), Motorola (Schaumberg, Ill.) and Scientific Atlanta (Atlanta, Ga.). This matched set aspect of CA systems has the effect that the "legacy" vendor is locked in as the supplier of additional STBs. Since the various technologies for conditional access are not mutually compatible (and are often proprietary), any new potential supplier is forced to license the legacy CA. Thus, the cable operator finds itself unable to acquire newer technology or competing technology from other set-top box manufacturers since the technology owners are often unwilling to cooperate, or charge reasonable license fees. This inflexibility can be especially troublesome when cable companies with disparate CA systems are merged. Service providers would like more than one source for STBs for any number of reasons.

Once a cable operator picks an encryption scheme, it is difficult to change or upgrade the content encryption scheme without introducing a backward compatible decoding device (e.g. set-top box). Providing multiple mode capability in new set-top boxes to handle multiple encryption systems can add substantial cost to any new set-top box, providing that the technology can be made available to the STB vendor to provide the multiple decryption capability.

The only known current option to avoiding domination by the legacy vendor (short of wholesale replacement) is using "full dual carriage". Full dual carriage means that transmission is duplicated for each encrypted program—once for each type of CA encryption to be used. To provide full dual carriage, the headend is enhanced to provide each form of CA simultaneously. Legacy STBs should not be impacted and should continue to perform their function despite any change. However, full dual carriage often comes at an unpalatable price because of the bandwidth impact, thus reducing the number of unique programs available. Generally, the number of premium channels suffers so that the number of options available to the viewer are limited and the value that can be provided by the cable operator is restricted.

A conventional cable system arrangement is depicted in FIG. 1. In such a system, the cable operator processes audio/video (A/V) content 14 with CA technology from manufacturer A (system A) using CA encryption equipment 18 compliant with system A at the cable system—headend 22. The encrypted A/V content along with system information (SI) 26 and program specific information (PSI) 27 is multiplexed together and transmitted over the cable system 32 to a user's STB 36. STB 36 incorporates decrypting CA equipment from system A (manufacturer A) 40 that decrypts the A/V content. The decrypted A/V content can then be supplied to a television set 44 for viewing by the user.

In a cable system such as that of FIG. 1, digital program streams are broken into packets for transmission. Packets for each component of a program (video, audio, auxiliary data, etc.) are tagged with a packet identifier or PID. These packet streams for each component of all programs carried within a channel are aggregated into one composite stream. Additional packets are also included to provide decryption keys and other overhead information. Otherwise unused bandwidth is filled with null packets. Bandwidth budgets are usually adjusted to utilize about 95% of the available channel bandwidth.

Overhead information usually includes guide data describing what programs are available and how to locate the associated channels and components. This guide data is also known as system information or SI. SI may be delivered to the STB in-band (part of the data encoded within a channel) or out-of-band (using a special channel dedicated to the purpose). Electronically delivered SI may be partially duplicated in more traditional forms—grids published in newspapers and magazines.

In order for a viewer to have a satisfying television experience, it is generally desirable that the viewer have clear access to both audio and video content. Some analog cable systems have used various filtering techniques to obscure the video to prevent an unauthorized viewer from receiving programming that has not been paid for. In such a system, the analog audio is sometimes sent in the clear. In the Motorola VideoCipher 2 Plus system used in C-band satellite transmissions, strong digital audio encryption is used in conjunction with a relatively weak protection of the analog video (using sync inversion). In airline in-flight movie systems, the availability of audio only through rental of headphones has been used to provide the full audio and video only to paying customers.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

Figure 1:
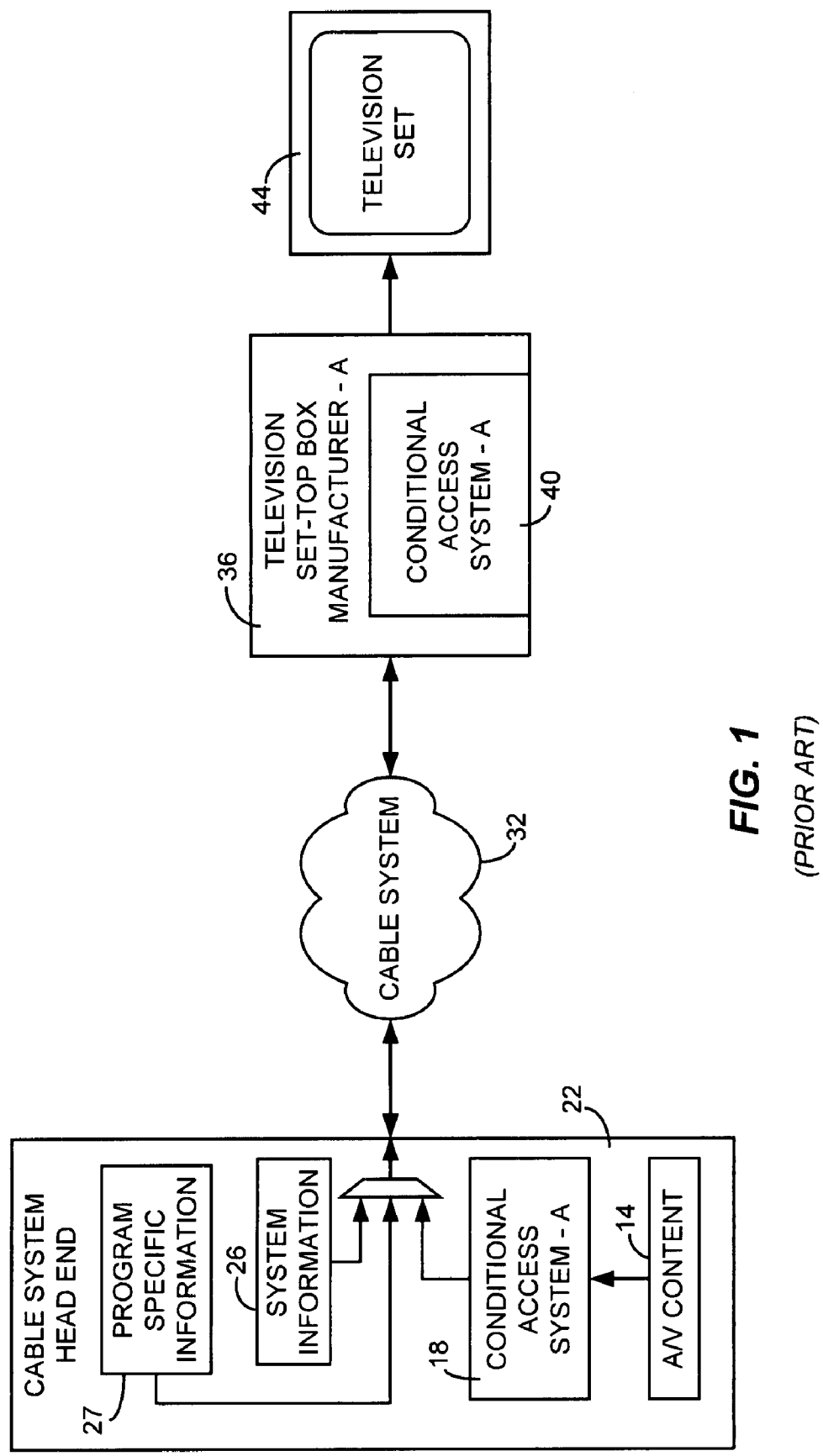
FIG. 1 is a block diagram of a conventional conditional access cable system.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings. The terms "scramble" and "encrypt" and variations thereof are used synonymously herein. Also, the term "television program" and similar terms can be interpreted in the normal conversational sense, as well as a meaning wherein the term means any segment of A/V content that can be displayed on a television set or similar monitor device.

Overview

Modern digital cable networks generally use CA systems that fully encrypt digital audio and video to make programming inaccessible except to those who have properly subscribed. Such encryption is designed to thwart hackers and non-subscribers from receiving programming that has not been paid for. However, as cable operators wish to provide their subscribers with set-top boxes from any of several manufacturers, they are frustrated by the need to transmit multiple copies of a single program encrypted with multiple encryption technologies compliant with the CA systems of each STB manufacturer.

This need to carry multiple copies of the programming (called "full dual carriage") uses up valuable bandwidth that could be used to provide the viewer with additional programming content. Certain embodiments of the present invention address this problem in which the bandwidth requirements to provide an equivalent to multiple carriage are minimized. The result could be described as "Virtual Dual Carriage" since the benefits of full dual carriage are provided without the full bandwidth cost. Several embodiments of the present invention are presented herein to accomplish effective partial scrambling. These embodiments vary by the criteria used to select the portion to encrypt. The portion selected in turn affects the additional bandwidth requirements and the effectiveness of the encryption. It may be desirable to use one encryption process or several processes in combination in a manner consistent with embodiments of the present invention.

Certain of the implementations of partial dual encryption described herein utilize an additional (secondary) PID for each duplicated component. These secondary PIDs are used to tag packets that carry duplicated content with an additional encryption method. The PSI is enhanced to convey information about the existence of these new PIDs in such a way that inserted PIDs are ignored by legacy STBs but can be easily extracted by new STBs.

Some implementations of partial dual encryption involve duplicating only certain packets tagged with a given PID. Methods for selecting which packets to encrypt are detailed hereinafter. The original (i.e. legacy) PID continues to tag the packets encrypted with legacy encryption as well as other packets sent in the clear. The new PID is used to tag packets encrypted by the second encryption method. Packets with the secondary PID shadow the encrypted packets tagged with the primary PID. The packets making up the encrypted pairs can occur in either order but, in the preferred implementation, maintain sequence with the clear portion of the PID stream. By use of the primary and secondary PIDs, the decoder located in the set-top box can readily determine which packets are to be decrypted using the decryption method associated with that set-top box, as will be clear upon consideration of the following description. The processes used to manipulate PIDs will be described later in greater detail.

The encryption techniques described herein can be broadly categorized (according to one categorization) into three basic variations—encrypting just a major portion (i.e. audio), encrypting just the SI, and encrypting just selected packets. In general, each of the encryption techniques used in the embodiments disclosed herein seek to encrypt portions of the an A/V signal or associated information while leaving other portions of the A/V signal in the clear to conserve bandwidth. Bandwidth can be conserved because the same clear portion can be sent to all varieties of set-top boxes. Various methods are used to select the portions of information to be encrypted. By so doing, the various embodiments of this invention eliminate the traditional "brute-force" technique of encrypting the entire content in one specific scrambling scheme, which predicates the redundant use of bandwidth if alternate scrambling schemes are desired. In addition, each of the partial dual encryption schemes described herein can be used as a single partial encryption scheme without departing from embodiments of the present invention.

The various embodiments of the invention allow each participating CA system to be operated independently. Each is orthogonal to the other. Key sharing in the headend is not required since each system encrypts its own packets. Different key epochs may be used by each CA system. For example, packets encrypted with Motorola's proprietary encryption can use fast changing encryption keys using the embedded security ASIC, while packets encrypted with NDS' smart card based system use slightly slower changing keys. This embodiment works equally well for Scientific Atlanta and Motorola legacy encryption.

The various embodiments of the invention allow each participating CA system to be operated independently. Each is orthogonal to the other. Key sharing in the headend is not required since each system encrypts its own patents. Different key epochs may be used by each CA system. For example, packets encrypted with Motorola's proprietary encryption can use fast changing encryption keys using the embedded security ASIC, while packets encrypted with NDS' smart card based system use slightly slower changing keys. This embodiment works equally well for Scientific Atlanta and Motorola legacy encryption.

Encrypted Elementary Stream

Figure 2:
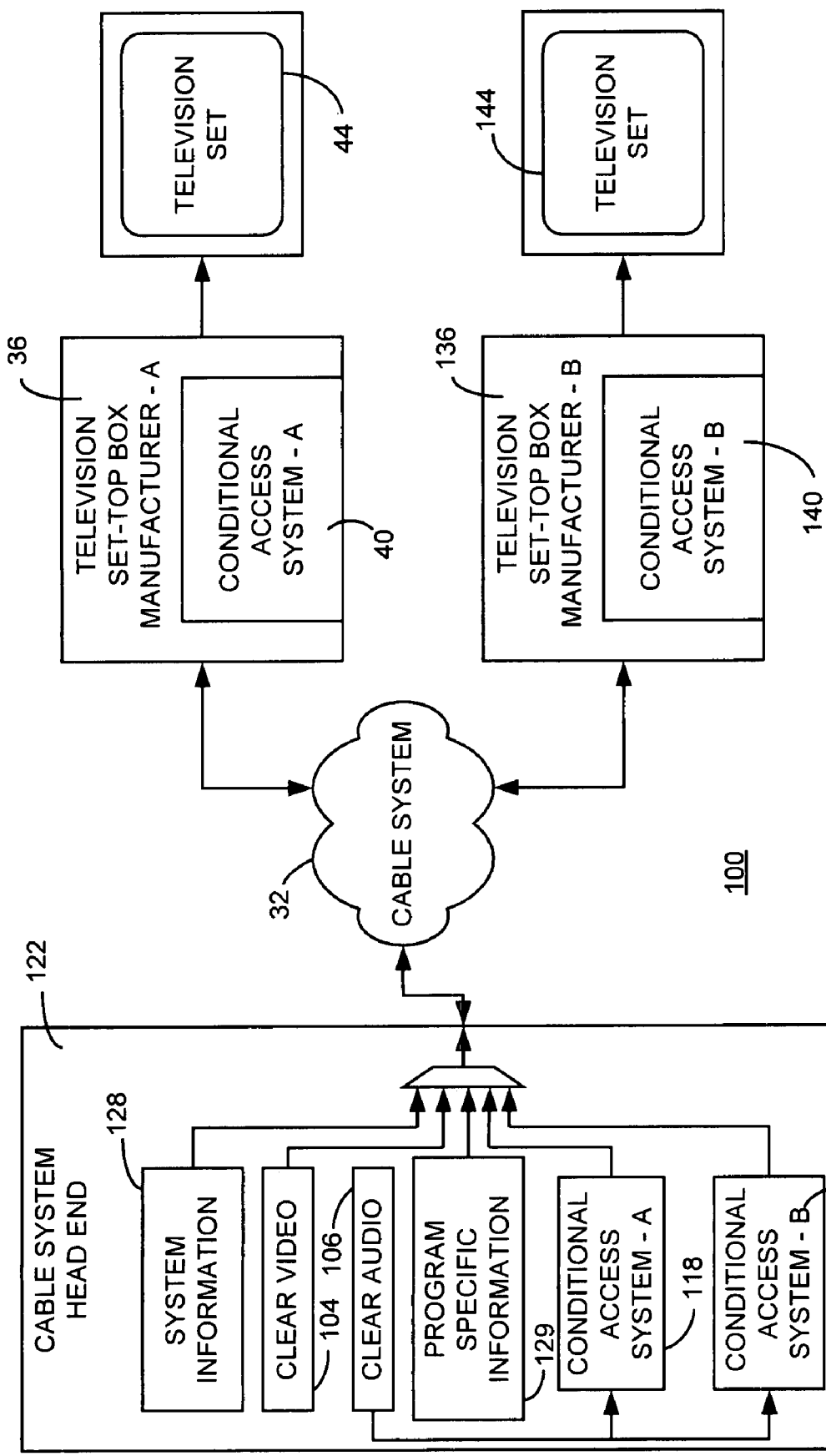
FIG. 2 is a block diagram of a system consistent with one embodiment of the present invention in which dual encrypted audio is transmitted along with clear video.

Turning now to FIG. 2, one embodiment of a system that reduces the need for additional bandwidth to provide multiple carriage is illustrated as system 100. In this embodiment, the system takes advantage of the fact that viewing television programming without audio is usually undesirable. While there are exceptions (e.g., adult programming, some sporting events, etc.), the typical viewer is unlikely to accept routine viewing of television programming without being able to hear the audio. Thus, at headend 122, the video signal 104 is provided in the clear (unencrypted) while the clear audio 106 is provided to multiple CA systems for broadcast over the cable network. In the exemplary system 100, clear audio 106 is provided to an encryption system 118 that encrypts audio data using encryption system A (encryption system A will be considered the legacy system throughout this document). Simultaneously, clear audio 106 is provided to encryption system 124 that encrypts the audio data using encryption system B. Clear video is then multiplexed along with encrypted audio from 118 (Audio A) and encrypted audio from 124 (Audio B), system information 128 and program specific information 129.

After distribution through the cable system 32, the video, system information, program specific information, Audio A and Audio B are all delivered to set-top boxes 36 and 136. At legacy STB 36, the video is displayed on television 44 and the encrypted audio is decrypted at CA system A 40 for play on television set 44. Similarly, at new STB 136, the video is displayed on television 144 and the encrypted audio is decrypted at CA system B 140 for play on television set 144.

Audio has a relatively low bandwidth requirement compared with a complete AN program (or even just the video portion). The current maximum bit rate for stereophonic audio at 384 Kb/second is approximately 10% of a 3.8 Mb/second television program. Thus, for dual carriage of only encrypted audio (with video transmitted in the clear) in a system with ten channels carried with 256 QAM (quadrature amplitude modulation), a loss of only about one channel worth of bandwidth would occur. Therefore, approximately nine channels could be carried. This is a dramatic improvement over the need to dual encrypt all channels, which would result in a decrease in available channels from ten to five. Where deemed necessary, e.g., sporting events, pay per view, adult programming, etc., dual encryption of both audio and video can still be carried out, if desired.

Both legacy and new set-top boxes can function in a normal manner receiving video in the clear and decrypting the audio in the same manner used for fully decrypting encrypted A/V content. If the user has not subscribed to the programming encrypted according to the above scheme, at best the user can only view the video without an ability to hear the audio. For enhanced security over the video, it is possible to employ other embodiments of the invention (as will be described later) here as well. (For example, the Si may be scrambled to make it more difficult for a non-authorized set-top box to tune to the video portion of the program.) Unauthorized set-top boxes that have not been modified by a hacker, will blank the video as a result of receipt of the encrypted audio.

Authorized set-top boxes receive Entitlement Control Messages (ECM) that are used to get access criteria and descrambling keys. The set-top box attempts to apply the keys to video as well as the audio. Since the video is not scrambled, it simply passes through the set-top boxes' descrambler unaffected. The set-top boxes do not care that the video is in-the-clear. The un-modified and un-subscribed set-top boxes behave as being un-authorized for the scrambled audio as well as the clear video. The video, as well as the audio which was actually scrambled, will be blanked. An on-screen display may appear on the TV stating that the viewer needs to subscribe to programming. This desirably totally inhibits the casual viewer from both hearing and viewing the content.

In one embodiment of the present invention, the encrypted audio is transmitted as digitized packets over the A/V channel. Two (or more) audio streams are transmitted encrypted according to the two (or more) encryption systems in use by the system's set-top boxes. In order for the two (or more) STBs to properly decrypt and decode their respective audio streams, SI (system information) data are transmitted from the cable system's headend 122 that identifies the particular channel where the audio can be found using a transmitted Service Identifier to locate the audio. This is accomplished by assigning the audio for system A a first packet identifier (PID) and assigning the audio for system B a second packet identifier (PID). By way of example, and not limitation, the following program specific information (PSI) can be sent to identify the location of the audio for two systems, one using NDS conditional access and one using Motorola conditional access. Those skilled in the art will understand how to adapt this information to the other embodiments of partial encryption described later herein.

The SI can be separately delivered to both legacy and non-legacy set-top boxes. It is possible to send SI information so that the legacy and non-legacy set-top boxes operate essentially without interference. In the SI delivered to legacy set-top boxes, the VCT (virtual channel table) would state that the desired program, e.g. HBO referenced as program number 1, is on Service ID "1" and that the VCT access control bit is set. The network information table (NIT) delivered to that first STB would indicate that Service ID "1" is at frequency=1234. In the SI delivered to non-legacy set-top boxes, the VCT would state that the desired program, e.g. HBO referenced as program number 1001, is on Service ID "1001" and that the VCT access control bit is set. The network information table delivered to the non-legacy STB would indicate that the Service ID "1001" is at frequency 1234. The following exemplary program association Table PSI data are sent to both legacy and non-legacy set-top boxes (in MPEG data structure format):

---

PAT sent on PID = 0x0000

PAT 0x0000
    Transport Stream ID
    PAT version
    Program Number 1
        PMT 0x0010
    Program Number 2
        PMT 0x0020
    Program Number 3
        PMT 0x0030
    Program Number 4
        PMT 0x0040
    Program Number 5
        PMT 0x0050
    Program Number 6
        PMT 0x0060
    Program Number 7
        PMT 0x0070
    Program Number 8
        PMT 0x0080

-continued

PAT sent on PID = 0x0000

Program Number 9
        PMT 0x0090
    Program Number 1001
        PMT 0x1010
    Program Number 1002
        PMT 0x1020
    Program Number 1003
        PMT 0x1030
    Program Number 1004
        PMT 0x1040
    Program Number 1005
        PMT 0x1050
    Program Number 1006
        PMT 0x1060
    Program Number 1007
        PMT 0x1070
    Program Number 1008
        PMT 0x1080
    Program Number 1009
        PMT 0x1090

---

The following exemplary program map table PSI data are selectively received by legacy and non-legacy set-top boxes (in MPEG data structure format):

---

PMT sent on PID = 0x0010

PMT 0x0010
    PMT Program number 1
    PMT Section Version 10
    PCR PID 0x0011
    Elementary Stream
        Stream Type (Video 0x02 or 0x80)
        Elementary PID (0x0011)
        Descriptor
        CA Descriptor (ECM) for CA provider #1
    Elementary Stream
        Stream Type (Audio 0x81)
        Elementary PID (0x0012)
        Descriptor
        CA Descriptor (ECM) for CA provider #1
PMT sent on PID = 0x1010

PMT 0x1010
    PMT Program number 1010
    PMT Section Version 10
    PCR PID 0x0011
    Elementary Stream
        Stream Type (Video 0x02 or 0x80)
        Elementary PID (0x0011)
        Descriptor
        CA Descriptor (ECM) for CA provider #2
    Elementary Stream
        Stream Type (Audio 0x81)
        Elementary PID (0x0013)
        Descriptor
        CA Descriptor (ECM) for CA provider #2

---

Considering an example wherein it is desired to deliver programming in a system using either Motorola or Scientific Atlanta as well as NDS CA, the above communications are consistent with the PSI delivered by both Motorola and Scientific Atlanta in their CA systems, with only minor changes. The program association table (PAT) is changed to reference an additional program map table (PMT) for each program. Each program in this embodiment has two program numbers in the PAT. In the table above, program number 1 and program number 1001 are the same program except that they will reference different audio PIDs and CA descriptors. Changes in the system to create multiple PMTs and to multiplex new PAT and PMT information with the data stream can be made to appropriately modify the cable system headend equipment. Again, those skilled in the art will understand how to adapt these messages to other partial encryption schemes described herein. An advantage of this approach is that no special hardware or software is required for headend or for legacy and non-legacy set-top boxes to deliver audio that is both legacy and non-legacy encrypted using this scheme.

This technique deters the user from use of premium programming which has not been paid for by rendering it inaudible, but a hacker may attempt to tune the video. To combat this, the mechanisms employed in other encryption techniques consistent with the present invention (as will be described later) can be employed simultaneously, if desired. Since closed captioning is generally transmitted as a part of the video data, the user can still obtain readable audio information in conjunction with clear video. Thus, although adequate for some applications, the present technique alone may not provide adequate protection in all scenarios. In another embodiment, video packets containing closed captioning information as a part of the payload can additionally be scrambled.

In an alternative embodiment, only the video may be dual encrypted with separate PIDs assigned to each set of encrypted video. While this may provide a more secure encryption for general programming (since video may be more important than audio), the amount of bandwidth savings compared with full dual carriage is only approximately ten percent, since only the audio is shared amongst all the set-top boxes. However, this approach might be used for certain content, e.g. adult and sports, and help reduce the bandwidth overhead for that content while the audio encryption approach may be used for other content types. In the Digital Satellite Service (DSS) transport standard used for the DirecTV service, the audio packets can be identified for encryption by use of the service channel identifier (SCID) which is considered equivalent.

Time Slicing

Figure 3:
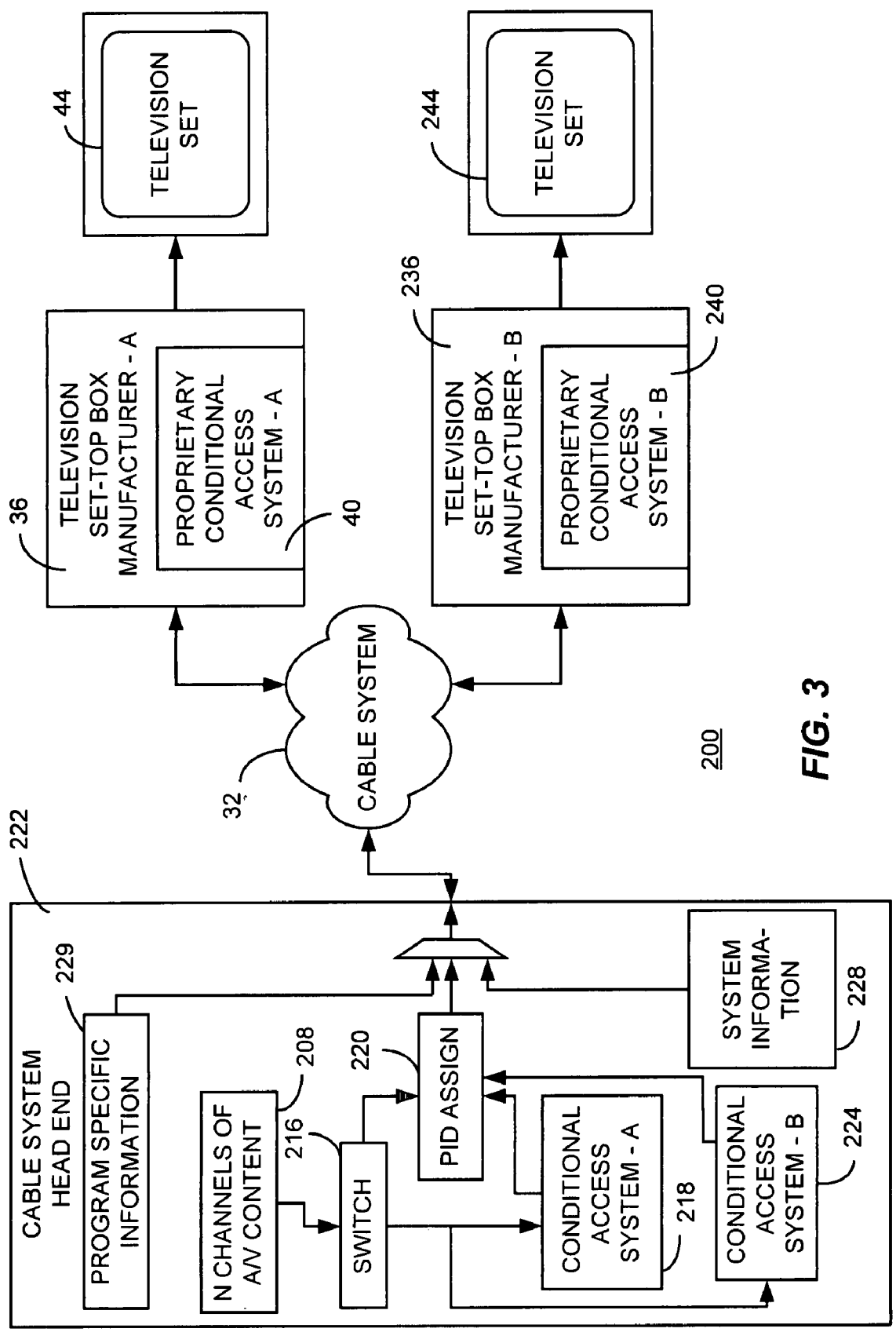
FIG. 3 is a block diagram of a system consistent with an embodiment of the present invention in which portions of programming are dual encrypted according to a time slice mechanism.

Another embodiment consistent with the present invention is referred to herein as time slicing and is illustrated in FIG. 3 as system 200. In this embodiment, a portion of each program is encrypted on a time dependent basis in a manner that disrupts viewing of the program unless the user has paid for the programming. This embodiment of the invention can be implemented as partially encrypted video and clear audio, clear video and partially encrypted audio or partially encrypted video and audio. The duration of the time slice that is encrypted, taken as a percentage of the total time, can be selected to meet any suitable desired balance of bandwidth usage and security against hackers. In general, under any of the embodiments described herein, less than 100 percent of the content is encrypted to produce a desired partial encryption. The following example details partially encrypted video and audio.

By way of example, and not limitation, consider a system which has nine programs that are to be dual partially encrypted according to the present exemplary embodiment. These nine channels are fed to the cable headend as a multiplexed stream of packets and are digitally encoded using packet identifiers (PID) to identify packets associated with a particular one of the nine programs. In this example, assume that those nine programs have video PIDs numbered 101-109 and audio PIDs numbered 201-209. The partial encryption, according to this embodiment is time multiplexed among the programs so that only packets from a single program are encrypted at any given time. The method does not need to be content aware.

With reference to TABLE 1 below, an exemplary embodiment of a time slice dual encryption scheme consistent with an embodiment of the invention is illustrated. For program 1 having primary video PID 101 and primary audio PID 201, during the first time period, packets having PID 101 and PID 201 are encrypted using encryption system A, while the others representing the other programs are sent in the clear. In this embodiment, secondary PIDs are also assigned to both the video and the audio. The secondary PIDs are PID 111 for video and PID 211 for audio respectively for program 1. The packets with the secondary PIDs are encrypted using encryption system B during the first time period. The next eight time periods are sent in the clear. Then for time period 10, packets having any of the above four PIDs are again encrypted followed by the next eight time periods being sent in the clear. In a similar manner, during the second period of program 2 having primary video PID 102 and primary audio PID 202 are encrypted using encryption system A and packets with their associated secondary PIDs are encrypted using encryption system B, and during the next eight time periods are sent in the clear, and so on. This pattern can be seen clearly in TABLE 1 by examination of the first nine rows. Both audio and video packets, or audio alone or video alone can be encrypted according to this technique, without departing from the invention. Also, the audio and video can have their own individual encryption sequence. In TABLE 1, P1 indicates time period number 1, P2 indicated time period number 2 and so on. EA indicates that the information is encrypted using CA system A and EB indicates that the information is encrypted using CA encryption system B.

TABLE 1

| PROG. | VIDEO PID | AUDIO PID | P1 | P2 | P3 | P4 | P5 | P6 | P7 | P8 | P9 | P10 | P11 | P12 | ... |
|---|---|---|---|---|---|---|---|---|---|---|---|---|---|---|---|
| 1 | PID 101 | PID 201 | EA | clear | clear | clear | clear | clear | clear | clear | clear | EA | clear | clear | ... |
| 2 | PID 102 | PID 202 | clear | EA | clear | clear | clear | clear | clear | clear | clear | clear | EA | clear | ... |
| 3 | PID 103 | PID 203 | clear | clear | EA | clear | clear | clear | clear | clear | clear | clear | clear | EA | ... |
| 4 | PID 104 | PID 204 | clear | clear | clear | EA | clear | clear | clear | clear | clear | clear | clear | clear | ... |
| 5 | PID 105 | PID 205 | clear | clear | clear | clear | EA | clear | clear | clear | clear | clear | clear | clear | ... |
| 6 | PID 106 | PID 206 | clear | clear | clear | clear | clear | EA | clear | clear | clear | clear | clear | clear | ... |
| 7 | PID 107 | PID 207 | clear | clear | clear | clear | clear | clear | EA | clear | clear | clear | clear | clear | ... |
| 8 | PID 108 | PID 208 | clear | clear | clear | clear | clear | clear | clear | EA | clear | clear | clear | clear | ... |
| 9 | PID 109 | PID 209 | clear | clear | clear | clear | clear | clear | clear | clear | EA | clear | clear | clear | ... |
| 1 | PID 111 | PID 211 | EB | | | | | | | | | EB | | | ... |
| 2 | PID 112 | PID 212 | | EB | | | | | | | | | EB | | ... |
| 3 | PID 113 | PID 213 | | | EB | | | | | | | | | EB | ... |
| 4 | PID 114 | PID 214 | | | | EB | | | | | | | | | ... |

TABLE 1-continued

| PROG. | VIDEO PID | AUDIO PID | P1 | P2 | P3 | P4 | P5 | P6 | P7 | P8 | P9 | P10 | P11 | P12 | ... |
|---|---|---|---|---|---|---|---|---|---|---|---|---|---|---|---|
| 5 | PID 115 | PID 215 | | | | | EB | | | | | | | | ... |
| 6 | PID 116 | PID 216 | | | | | | EB | | | | | | | ... |
| 7 | PID 117 | PID 217 | | | | | | | EB | | | | | | ... |
| 8 | PID 118 | PID 218 | | | | | | | | EB | | | | | ... |
| 9 | PID 119 | PID 219 | | | | | | | | | EB | | | | ... |

In order to retain compatibility with an established legacy encryption system (encryption system A), the encrypted periods for each of programs one through nine are encrypted using encryption system A. Legacy STB equipment will accept such partially encrypted A/V data streams passing unencrypted packets and decrypting encrypted packets transparently. However, it is desired to obtain dual encryption using both encryption system A and encryption system B. In order to achieve this, a specified program is assigned both primary PIDs (e.g., for program 1, video PID 101 and audio PID 201) and a secondary PID (e.g., for program 1, video PID 111 and audio PID 211) to carry the elementary data streams for a given premium channel.

With reference to FIG. 3, system 200 generally depicts the functionality of the cable system headend 222 wherein N channels of clear video 208 at the headend 222 are provided to an intelligent switch 216 (operating under control of a programmed processor) which routes packets that are to be transmitted in the clear to be assigned a primary PID at 220. Packets that are to be encrypted are routed to both conditional access system A encrypter 218 and to conditional access system B encrypter 224. Once encrypted, these encrypted packets from 218 and 224 are assigned primary or secondary PIDs respectively at 220. System information from 228 and PSI from 229 are multiplexed or combined with the clear packets, the system A encrypted packets and the system B encrypted packets and broadcast over the cable system 32.

For discussion purposes, if the period of the time slice is 100 milli-seconds, then as shown in TABLE 1, there are on average one and a fraction encrypted periods totaling 111 milli-seconds each second for all nine-programs. If the period is 50 milli-seconds, then there are on average two and a fraction encrypted periods totaling 111 milli-seconds. A non-subscribing box attempting to tune video would obtain a very poor image if it could maintain any sort of image lock and the audio would be garbled.

The PSI for a partially scrambled stream is handled slightly differently from the dual audio encryption example above. Essentially, the same Si and PAT PSI information can be sent to both legacy and non-legacy set-top boxes. The difference lies with the PMT PSI information. The legacy set-top box parses the PMT PSI and obtains the primary video and audio PIDs as before. The non-legacy set-top box obtains the primary PIDs like the legacy set-top box but must look at the CA descriptors in the PMT PSI to see if the stream is partially scrambled. The secondary PID is scrambled specifically for a particular CA provider, consequently it makes sense to use the CA descriptor specific to a particular CA provider to signal that PID. The invention can allow more than two CA providers to co-exist by allowing more than one secondary PID. The secondary PID shall be unique to a particular CA provider. The set-top box knows the CA ID for the CA it has, and can check all CA descriptors for the relevant one for it.

While it is possible to send the secondary PID data as private data in the same CA descriptor used for the ECM, the preferred embodiment uses separate CA descriptors. The secondary PID is placed in the CA PID field. This allows head-end processing equipment to "see" the PID without having to parse the private data field of the CA descriptor. To tell the difference between the ECM and secondary PID CA descriptor, a dummy private data value can be sent.

| PMT sent on PID = 0x0010 |
|---|
| PMT 0x0010<br>    PMT Program number 1<br>    PMT Section Version 10<br>    PCR PID 0x0011<br>    Elementary Stream<br>        Stream Type (Video 0x02 or 0x80)<br>        Elementary PID (0x0011)<br>        Descriptor<br>        CA Descriptor (ECM) for CA provider #1<br>        CA Descriptor (ECM) for CA provider #2<br>        CA Descriptor (Secondary PID) for CA provider #2<br>    Elementary Stream<br>        Stream Type (Audio 0x81)<br>        Elementary PID (0x0012)<br>        Descriptor<br>        CA Descriptor (ECM) for CA provider #1<br>        CA Descriptor (ECM) for CA provider #2<br>        CA Descriptor (Secondary PID) for CA provider #2 |

| CA Descriptor for CA Provider #2 (ECM) |
|---|
| Descriptor<br>    Tag: Conditional Access (0x09)<br>    Length: 4 Bytes<br>    Data<br>        CA System ID: 0x0942 ($2^{nd}$ CA provider)<br>        CA PID (0x0015) |

| CA Descriptor for CA Provider #2 (Secondary PID) |
|---|
| Descriptor<br>    Tag: Conditional Access (0x09)<br>    Length: 5 Bytes<br>    Data<br>        CA System ID: 0x1234 ($2^{nd}$ CA provider)<br>        CA PID (0x0016)<br>        Private Data |

Legacy STB 36 operating under CA system A receives the data, ignores the secondary PIDs, decrypts the packets encrypted under CA system A and presents the program to the television set 44. New or non-legacy STB 236 receives the SI 228. It receives PSI 229 and uses the PMT to identify the primary and secondary PID, called out in the second CA descriptor, associated with the program being viewed. The packets encrypted under CA system A are discarded and the packets encrypted under CA system B with the secondary PID are decrypted by CA system B 240 and inserted into the clear data stream for decoding and display on television set 244.

Figure 4:
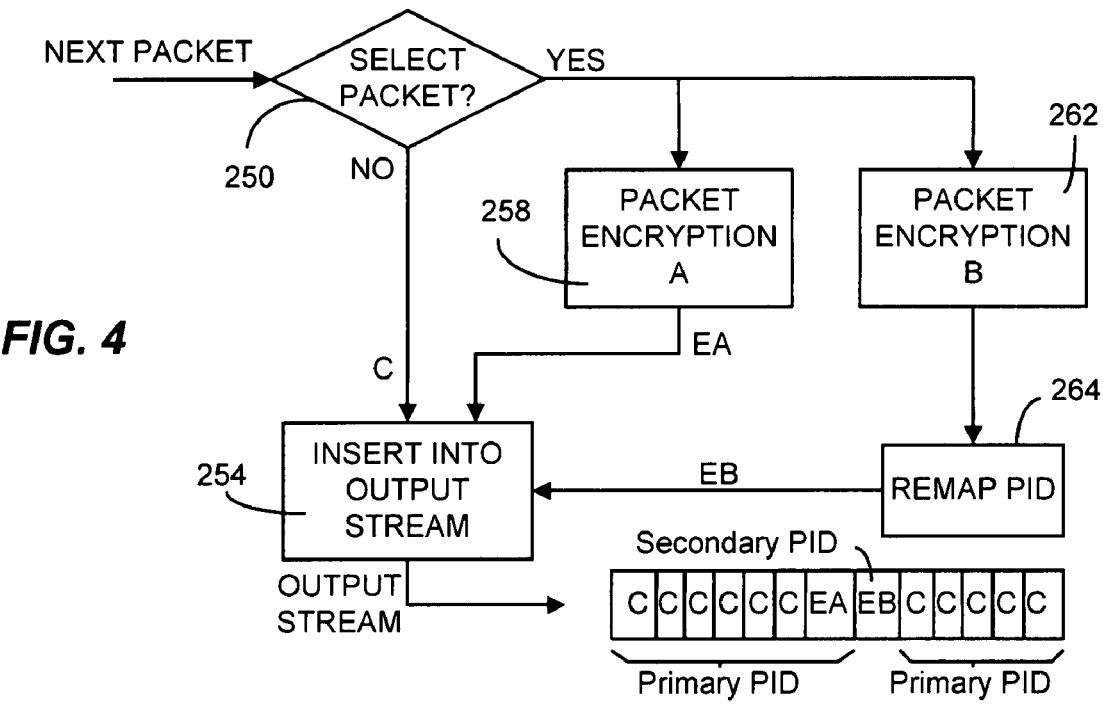
FIG. 4 is a flow chart of a dual encryption process consistent with certain embodiments of the present invention.

FIG. 4 illustrates one process for encoding at the cable system headend that can be used to implement an embodiment of the present invention wherein CA system A is the legacy system and CA system B is the new system to be introduced. As a clear packet is received, at 250 for a given program, if the packet (or frame) is not to be encrypted (i.e., it is not the current time slice for encryption for this program), the clear packet (C) is passed on to be inserted into the output stream at 254. If the current packet is to be encrypted by virtue of the current packet being a part of the encryption time slice, the packet is passed for encryption to both packet encryption process A 258 and packet encryption process B 262. The encrypted packets from encryption process A at 258 (EA) are passed on to 254 for insertion into the output stream. The encrypted packets from encryption process B at 262 (EB) are assigned a secondary PID at 264 for insertion into the output stream at 254. This is repeated for all packets in the program.

Figure 5:
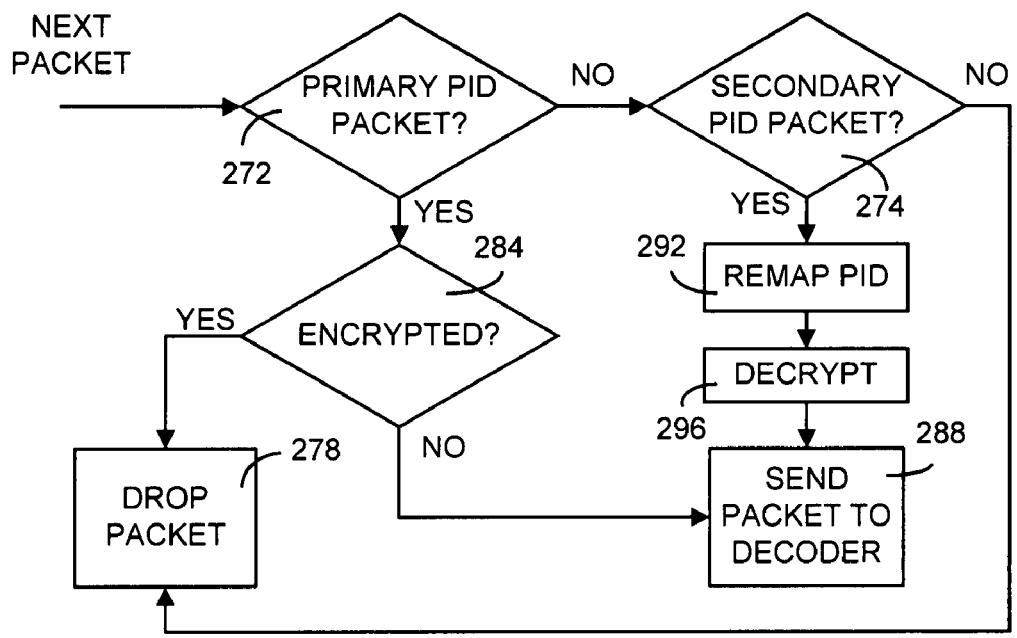
FIG. 5 is a flow chart of a decryption process consistent with certain embodiments of the present invention.

FIG. 5 illustrates a process used in the STB 236 having the newly introduced CA system B for decrypting and decoding the received data stream containing C, EA and EB packets having primary and secondary PIDs as described. When a packet is received at 272, it is inspected to see if it has a the primary PID of interest. If not, the packet is examined to see if it has the secondary PID of interest at 274. If the packet has neither the primary or secondary PID, it is ignored or dropped at 278. Any intervening packets between the EA and EB packets that are not the primary or secondary PID are discarded. It is an implementation and mainly a buffering issue whether a decoder can receive multiple EA or EB in a row before receiving the replacement matched EA or EB packet. Also, it is just as easy to detect for secondary packets that come before and not after the primary packet. It is also possible to design a circuit where either case can happen—the secondary packet can be either before or after the primary packet. If the packet has the primary PID of interest, the packet is examined at 284 to determine if it is encrypted. If not, the packet (C) is passed directly to the decoder at 288 for decoding. If the packet is encrypted at 284, it is deemed to be an EA packet and is dropped or ignored at 278. In some implementations, the primary packet's encryption does not get checked at 284. Rather, its simple position relative to the secondary packet can be checked at 284 to identify it for replacement.

If the packet has the secondary PID at 274, the PID is remapped to the primary PID at 292 (or equivalently, the primary PID is remapped to the secondary PID value). The packet is then decrypted at 296 and sent to the packet decoder at 288 for decoding. Of course, those skilled in the art will recognize that many variations are possible without departing from the invention, for example, the order of 292 and 296 or the order of 272 and 274 can be reversed. As mentioned earlier, 284 can be replaced with a check of primary packet position with respect to the secondary packet. Other variations will occur to those skilled in the art.

Legacy STB 36 operating under the encryption system A totally ignores the secondary PID packets. Packets with the primary PID are decrypted, if necessary, and passed to the decoder without decryption if they are clear packets. Thus, a so called "legacy" STB operating under encryption system A will properly decrypt and decode the partially encrypted data stream associated with the primary PID and ignore the secondary PID without modification. STBs operating under the encryption system B are programmed to ignore all encrypted packets associated with the primary PID and to use the encrypted packets transmitted with the secondary PID associated with a particular channel.

Thus, each dual partially encrypted program has two sets of PIDs associated therewith. If, as described, the encryption is carried out on a period-by-period basis, for the system shown with an appropriate time slice interval, the picture will be essentially unviewable on a STB with either decryption.

Figure 6:
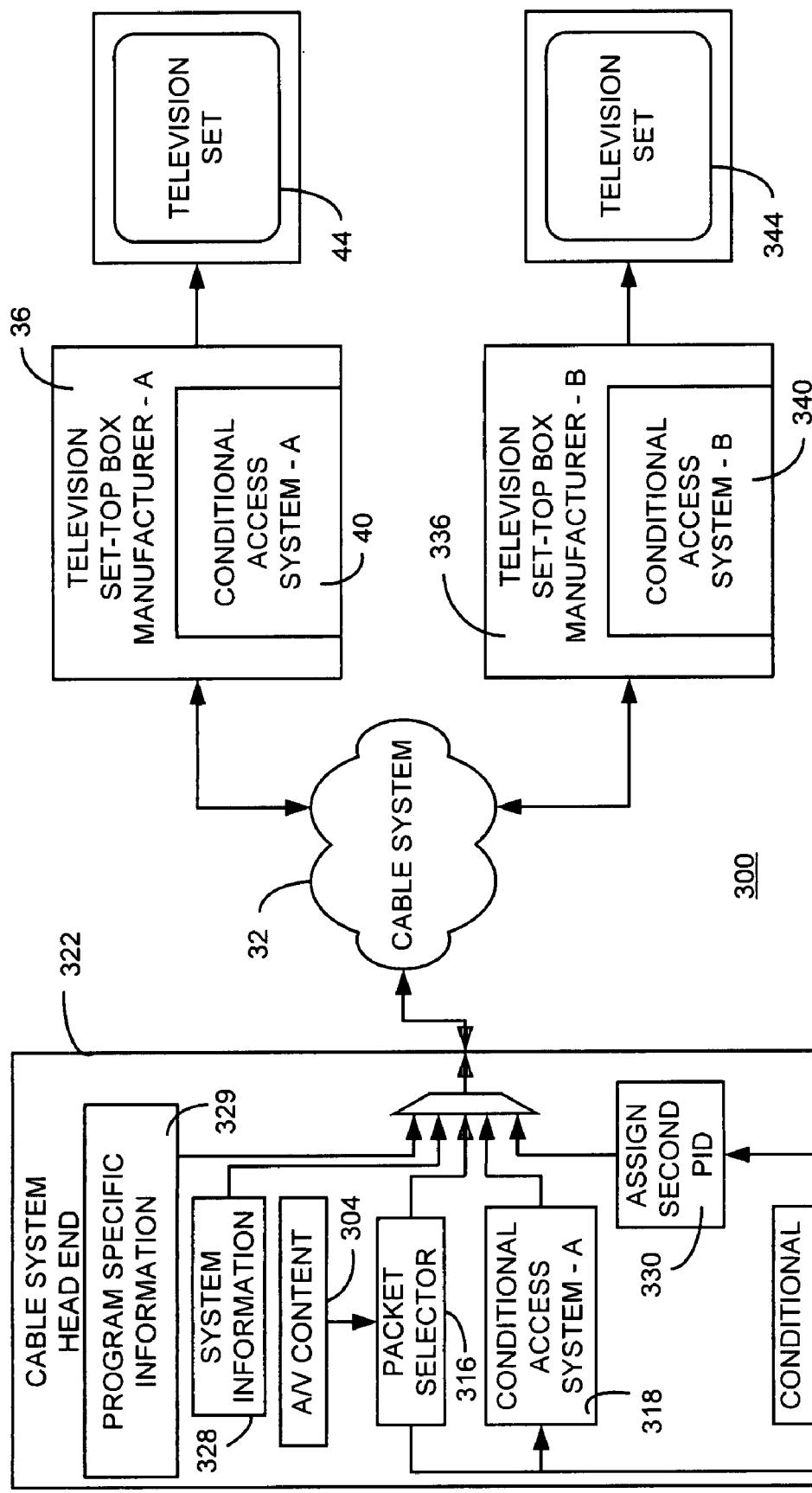
FIG. 6 is a block diagram of a system consistent with an embodiment of the present invention in which portions of programming are dual encrypted on a packet basis.

In order to implement this system in the headend 322 of FIG. 6, the SI and PSI can be modified for inclusion of a second set of CA descriptor information. Legacy set-top boxes may not be able to tolerate unknown CA descriptors. Consequently, alternatively, in the set-top box, it may be possible to "hard code" offsets from the legacy CA PIDs for both the content PIDs and/or the SI/PSI and ECM PIDs. Alternatively, parallel PSI may be sent. For example, an auxiliary PAT can be delivered on PID 1000 instead of PID 0 for the non-legacy set-top boxes. It can reference auxiliary PMTs not found in the legacy PAT. The auxiliary PMTs can contain the non-legacy CA descriptors. Since auxiliary PMTs would not be known to the legacy set-top boxes, there would not be any interoperation issue.

In systems where system A corresponds to legacy set-top boxes manufactured by Motorola or Scientific Atlanta, no modifications to the STBs are required. For the system B compliant STBs, for dual carriage of partially encrypted programs as described herein, the video and audio decoder are adapted to listen to two PIDs each (a primary and a secondary PID) instead of just one. There may be one or more secondary shadow PIDs, depending on the number of non-legacy CA systems in use, however a specific set-top box only listens to one of the secondary PIDs as appropriate for the CA method being used by that specific STB. In addition, ideally the encrypted packets from the PID carrying the mostly clear video or audio are ignored. Since ignoring "bad packets" (those that cannot be readily decoded as is) may already be a function that many decoders perform, thus requiring no modification. For systems with decoders that do not ignore bad packets, a filtering function can be used. It should be understood that the time slice encryption technique could be applied to just the video or the audio. Also, the video may be time slice encrypted while the audio is dual encrypted as in the earlier embodiment. The time slice technique may be applied to multiple programs concurrently. The number of programs that are encrypted during a period of time is mainly an issue of bandwidth allocation, and although the example discusses scrambling a single program at a time, the invention is not limited by that. Other combinations of encryption techniques described in this document will also occur to those skilled in the art.

$M^{TH}$ and N Packet Encryption

Another embodiment consistent with the present invention is referred to herein as $M^{th}$ & N packet encryption. This is a variation of the embodiment illustrated in FIG. 3 as system 200. In this embodiment, packets of each PID representing a program are encrypted in a manner that disrupts viewing of the program unless the user has paid for the programming. In this embodiment, M represents the number of packets between the start of an encryption event. N represents the number of packets that are encrypted in a row, once encryption takes place. N is less than M. If M=9 and N=1, then every nine packets there is an encryption event lasting 1 packet. If M=16 and N=2, then every sixteen packets there is an encryption event lasting two packets. Each packet to be dual partially encrypted is duplicated and processed using CA system A 218 and CA system B 224 as in the previous embodiment. The difference in operation between this embodiment and the time slicing technique previously is in the operation of switch 216 to effect the selection of packets to encrypt under control of a programmed processor.

By way of example, and not limitation, consider a system which has nine channels of programming that are to be dual encrypted according to the present exemplary embodiment. These nine channels are digitally encoded using packet identifiers (PID) to identify packets associated with a particular one of nine programs. In this example, assume that those nine programs have video PIDs numbered 101-109 and audio PIDs numbered 201-209. The encryption, according to this embodiment is random program-to-program so that packets from other programs may be encrypted at the same time. This is illustrated in TABLE 2 below in which M=6 and N=2 and in which only video is encrypted, but this should not be considered limiting. The method does not need to be content aware. In TABLE 2, PK1 indicated packet number 1, PK2 indicates packet number 2, and so on.

CE . . . ) is consistent with variations of the present partial encryption concept, as are random, pseudo-random and semi-random values for M and N may be used for selection of packets to encrypt. Random, pseudo-random or semi-random (collectively referred to as "random" herein) selection of packets can make it difficult for a hacker to algorithmically reconstruct packets in a post processing attempt to recover recorded scrambled content. Those skilled in the art will understand how to adapt this information to the other embodiments of partial encryption described later herein. Some of the embodiments can be used in combination to more effectively secure the content.

Data Structure Encryption

Another partial encryption method consistent with embodiments of the present invention uses a data structure as a basis for encryption. By way of example and not limitation, one convenient data structure to use for encryption is an

TABLE 2

| PROG. | VIDEO | PK1 | PK2 | PK3 | PK4 | PK5 | PK6 | PK7 | PK8 | PK9 | PK10 | PK11 | PK12 | ... |
|---|---|---|---|---|---|---|---|---|---|---|---|---|---|---|
| 1 | PID 101 | EA | EA | clear | clear | clear | clear | EA | EA | clear | clear | clear | clear | ... |
| 2 | PID 102 | clear | clear | clear | EA | EA | clear | clear | clear | clear | EA | EA | clear | ... |
| 3 | PID 103 | clear | clear | EA | EA | clear | clear | clear | clear | EA | EA | clear | clear | ... |
| 4 | PID 104 | clear | clear | clear | EA | EA | clear | clear | clear | clear | EA | EA | clear | ... |
| 5 | PID 105 | clear | clear | EA | EA | clear | clear | clear | clear | EA | EA | clear | clear | ... |
| 6 | PID 106 | EA | clear | clear | clear | clear | EA | EA | clear | clear | clear | clear | EA | ... |
| 7 | PID 107 | EA | EA | clear | clear | clear | clear | EA | EA | clear | clear | clear | clear | ... |
| 8 | PID 108 | clear | EA | EA | clear | clear | clear | clear | EA | EA | clear | clear | clear | ... |
| 9 | PID 109 | EA | clear | clear | clear | clear | EA | EA | clear | clear | clear | clear | EA | ... |
| 1 | PID 111 | EB | EB |  |  |  |  | EB | EB |  |  |  |  | ... |
| 2 | PID 112 |  |  |  | EB | EB |  |  |  |  | EB | EB |  | ... |
| 3 | PID 113 |  |  | EB | EB |  |  |  |  | EB | EB |  |  | ... |
| 4 | PID 114 |  |  |  | EB | EB |  |  |  |  | EB | EB |  | ... |
| 5 | PID 115 |  |  | EB | EB |  |  |  |  | EB | EB |  |  | ... |
| 6 | PID 116 | EB |  |  |  |  | EB | EB |  |  |  |  | EB | ... |
| 7 | PID 117 | EB | EB |  |  |  |  | EB | EB |  |  |  |  | ... |
| 8 | PID 118 |  | EB | EB |  |  |  |  | EB | EB |  |  |  | ... |
| 9 | PID 19 | EB |  |  |  |  | EB | EB |  |  |  |  | EB | ... |

In the example of TABLE 2, each program is encrypted fully independently of the others using the M=6 and N=2 encryption scheme. Again, the illustrated example encrypts only the video, but audio could also be encrypted according to this or another arrangement. If applied to just the video, audio may be dual scrambled or time slice encrypted as in earlier embodiments. Alternatively, if applied to just the audio, the video may be time sliced as in the earlier embodiment.

Those skilled in the art will recognize that many variations of the technique can be devised consistent with the partial scrambling concepts disclosed herein. For example, a pattern of five clear followed by two encrypted followed by two clear followed by one encrypted (CCCCCEECCECCCCCEEC MPEG video frame. This is illustrated (again with video only) in TABLE 3 below in which every tenth video frame is encrypted. In this embodiment, each program's ten frame encryption cycle is distinct from each other channel, but this should not be considered limiting. This concept can be viewed as a variation of the time slice or $M^{th}$ and N partial encryption arrangement (or other pattern) based upon video or audio frames (or some other data structure) with the exemplary embodiment having M=10 and N=1. Of course, other values of M and N can be used in a similar embodiment. In TABLE 3, F1 represents frame number 1, F2 represents frame number 2 and so on.

TABLE 3

| PROG. | VIDEO | F1 | F2 | F3 | F4 | F5 | F6 | F7 | F8 | F9 | F10 | F11 | F12 | ... |
|---|---|---|---|---|---|---|---|---|---|---|---|---|---|---|
| 1 | PID 101 | EA | clear | clear | clear | clear | clear | clear | clear | clear | clear | EA | clear | ... |
| 2 | PID 102 | clear | clear | clear | EA | clear | clear | clear | clear | clear | clear | clear | clear | ... |
| 3 | PID 103 | clear | clear | EA | clear | clear | clear | clear | clear | clear | clear | clear | clear | ... |
| 4 | PID 104 | clear | clear | clear | clear | EA | clear | clear | clear | clear | clear | clear | clear | ... |
| 5 | PID 105 | clear | clear | clear | EA | clear | clear | clear | clear | clear | clear | clear | clear | ... |
| 6 | PID 106 | EA | clear | clear | clear | clear | clear | clear | clear | clear | clear | EA | clear | ... |
| 7 | PID 107 | clear | EA | clear | clear | clear | clear | clear | clear | clear | clear | clear | EA | ... |
| 8 | PID 108 | clear | EA | clear | clear | clear | clear | clear | clear | clear | clear | clear | EA | ... |
| 9 | PID 109 | EA | clear | clear | clear | clear | clear | clear | clear | clear | clear | EA | clear | ... |
| 1 | PID 111 | EB |  |  |  |  |  |  |  |  |  | EB |  | ... |

TABLE 3-continued

| PROG. | VIDEO | F1 | F2 | F3 | F4 | F5 | F6 | F7 | F8 | F9 | F10 | F11 | F12 | ... |
|---|---|---|---|---|---|---|---|---|---|---|---|---|---|---|
| 2 | PID 112 |  |  |  | EB |  |  |  |  |  |  |  |  | ... |
| 3 | PID 113 |  |  | EB |  |  |  |  |  |  |  |  |  | ... |
| 4 | PID 114 |  |  |  |  | EB |  |  |  |  |  |  |  | ... |
| 5 | PID 115 |  |  |  | EB |  |  |  |  |  |  |  |  | ... |
| 6 | PID 116 | EB |  |  |  |  |  |  |  |  | EB |  |  | ... |
| 7 | PID 117 |  | EB |  |  |  |  |  |  |  |  | EB |  | ... |
| 8 | PID 118 |  | EB |  |  |  |  |  |  |  |  | EB |  | ... |
| 9 | PID 119 | EB |  |  |  |  |  |  |  |  | EB |  |  | ... |

Thus, again each encrypted program has two sets of PIDs associated therewith. If, as described, the encryption is carried out on a period-by-period basis, for the system shown, the picture wilt be essentially unviewable. For a nine program system at 30 frames per second as depicted, approximately three frames per second will be encrypted. For viewers who are not entitled to view the program, their STB will be unable to capture much more than an occasional frozen frame as the STB constantly attempts to synchronize and recover. Viewers who have subscribed to the programming will be able to readily view the programming. The bandwidth cost for such an encryption arrangement depends upon the frequency with which the encryption is applied. In the above example, an extra factor of ⅑ of data are transmitted for each program. In this example, approximately one program's worth of bandwidth is used. With a greater number of programs, fewer packets per program are encrypted and the security of the encryption system may degrade somewhat. As in the randomized M and N method, random frames may be selected. Choosing random frames, in the video case, would help guarantee that all frame types would be affected—intra-coded frames (I frames), predictive-coded (P frames), Bi-directional-coded (B frames) and DC frames.

In a variation of the invention, it may be possible to encrypt fewer packets to achieve an acceptable level of security. That is, perhaps in a system of nine programs, only one frame per second may need to be encrypted to achieve acceptable levels of security. In such a system, the overhead becomes one encrypted period per second per program or approximately ⅓₀ of data transmitted in overhead. This level of overhead is a dramatic improvement over the 50% loss of bandwidth associated with full dual carriage of encryption under two encryption systems. In another variation of the invention, it may be possible to encrypt only certain video frames to achieve an acceptable level of security. For example, for MPEG content, only intra-coded frames (I frames) may be scrambled to further reduce the bandwidth overhead and still maintain an acceptable level of security. These offer significant improvement over the bandwidth required for full dual carriage.

Critical Packet Encryption

Substantial efficiency in bandwidth utilization can be achieved by use of a selective packet-by-packet dual encryption technique. In this technique, packets are selected for encryption based upon their importance to the proper decoding of the audio and/or video of the program content.

This embodiment can reduce the bandwidth requirement compared with full dual carriage of encrypted content by only scrambling a small fraction of the packets. Clear packets are shared between the two (or more) dual carriage PIDs. In one preferred embodiment, as will be disclosed, less that about one percent of the total content bandwidth is used. In a system with a legacy encryption scheme, clear program content packets can be received by both legacy and new set-top boxes. As mentioned before, encrypted packets are dual carried and processed by the respective set-top boxes with the appropriate CA. Each CA system is orthogonal. Key sharing is not required and different key epochs may be used by each CA system. For example, a system with Motorola's proprietary encryption can generate fast changing encryption keys using the embedded security ASIC, while an NDS smart card based system can generate slightly slower changing keys. This embodiment works equally well for Scientific Atlanta and Motorola legacy encryption.

Referring now to FIG. 6, a block diagram of a system consistent with an embodiment of the present invention in which portions of programming are dual encrypted on a packet-by-packet basis is illustrated as system 300. In this system, packets of each program are dual encrypted using, for example, legacy CA system A and new CA system B. The packets that are encrypted are selected based upon their importance to the proper decoding of the video and/or audio stream.

In the system illustrated in FIG. 6, the cable system headend 322 selects AN content 304 packets at a packet selector 316 for encryption. Packets selected for encryption are chosen so that their non-receipt (by a non-paying decoder) would severely affect the real-time decoding of a program, and any possible post processing of recorded content. That is, only critical packets are encrypted. For the video and audio, this can be accomplished by encrypting "start of frame" transport stream packets containing PES (packetized elementary stream) headers and other headers as part of the payload, since without this information, the STB decoder cannot decompress the MPEG compressed data. MPEG2 streams identify "start of frame" packets with the "Packet Unit Start Indicator" in the transport header. Generally, packets carrying a payload that contains a group of pictures header or a video sequence header can be used to effect the present scrambling technique.

MPEG (Moving Pictures Expert Group) compliant compressed video repackages the elementary data stream into the transport stream in somewhat arbitrary payloads of 188 bytes of data. As such, the transport stream packets containing a PES header can be selected for encryption at selector 316 and dual encrypted by both the CA system A encrypter 318 and the CA system B encrypter 324. Packets to be dual partially encrypted are duplicated and the PIDs of duplicate packets encrypted by encrypter 324 are remapped at 330 to a secondary PID as in the previous embodiment. The remaining packets are passed in the clear. The clear packets, system A encrypted packets, system B encrypted packets, and system information 328, and PSI from 329 are multiplexed together for broadcast over the cable system 32.

As with the previous system, the legacy STB 36 receives clear data and data encrypted under CA encryption system A and transparently passes unencrypted data combined with data decrypted by CA decryption A 40 to its decoder. In the new STB 336, the program is assigned to both a primary and a secondary PID. The clear packets with the primary PID are received and passed to the decoder. The encrypted packets with the primary PID are discarded. Encrypted packets with the secondary PID are decrypted and then recombined with the data stream (e.g., by remapping the packets to the primary PID) for decoding.

Using video as an example, each sample is known as a frame and the sample rate is typically 30 frames per second. If the samples are encoded to fit into 3.8 Mbps, each frame would occupy 127K bits of bandwidth. This data is sliced for MPEG transport into packets of 188 bytes with the first packet(s) of each frame containing the header used for instructions to process the body of the frame data. Dual encrypting just the first header packet (1504 additional bits) requires only 1.2% (1504/127K) of additional bandwidth. For high definition (19 Mbps) streams the percentage is even less.

As previously stated, transport stream packets containing a PES header are the preferred target for encryption according to the present embodiment. These packets contain sequence headers, sequence extension headers, picture headers, quantization and other decode tables that also fall within the same packet. If these packets cannot be decoded (i.e., by a hacker attempting to view unauthorized programming without paying the subscription charges), not even small portions of the program can be viewed. In general, any attempt to tune to the program will likely be met with a blank screen and no audio whatsoever since known decoder integrated circuits use the PES header to sync up to an elementary stream such as video and audio in real-time. By encrypting the PES header, the decoding engine in an un-authorized set-top box cannot even get started. Post processing attacks, e.g. on stored content, are thwarted by dynamically changing information in the packet containing the PES header. Those skilled in the art will appreciate that for implementation of this embodiment of the invention, other critical or important packets or content elements may also be identified for encryption that could severely inhibit unauthorized viewing without departing from the present invention. For example, MPEG intra-coded or I frame picture packets could be encrypted to inhibit viewing of the video portion of the program. Embodiments the present invention may be used in any combination with other embodiments, e.g. scrambling the packet containing the PES header as well as random, $M^{th}$ and N, or data structure encryption of the other packets. Critical packet encryption may be applied to video encryption, while a different method may be applied to audio. Audio could be dual encrypted, for instance. Other variations within the scope of the present invention will occur to those skilled in the art.

Figure 7:
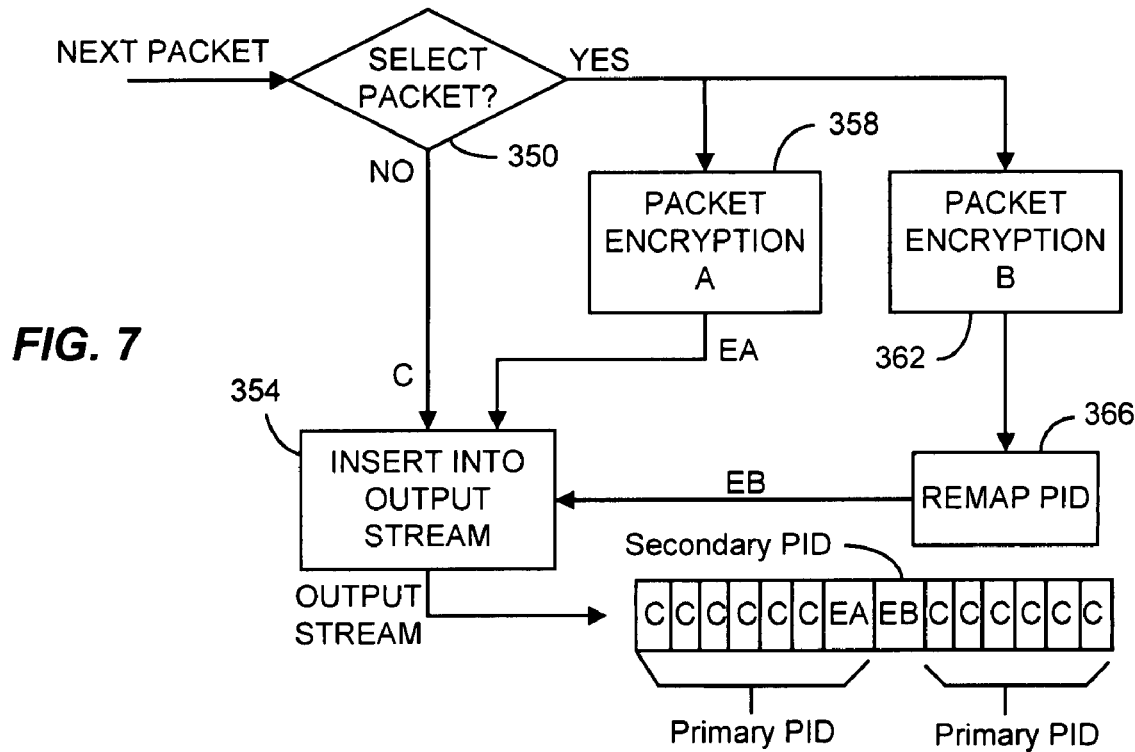
FIG. 7 is a flow chart of a dual encryption process consistent with certain embodiments of the present invention.

FIG. 7 is a flow chart depicting an exemplary encoding process such as that which would be used at headend 322 of FIG. 6. When a transport stream packet is received at 350, the packet is examined to determine if it meets a selection criteria for encryption. In the preferred embodiment, this selection criteria is the presence of a PES header as a portion of the packet payload. If not, the packet is passed as a clear unencrypted packet (C) for insertion into the output data stream at 354. If the packet meets the criteria, it is encrypted under CA encryption system A at 358 to produce an encrypted packet EA. The packet is also duplicated and encrypted under CA encryption system B at 362 to produce an encrypted packet. This encrypted packet is mapped to a secondary PID at 366 to produce an encrypted packet EB. Encrypted packets EA and EB are inserted into the output data stream along with clear packets C at 354. Preferably, the EA and EB packets are inserted at the location in the data stream where the single original packet was obtained for encryption so that the sequencing of the data remains essentially the same.

Figure 8:
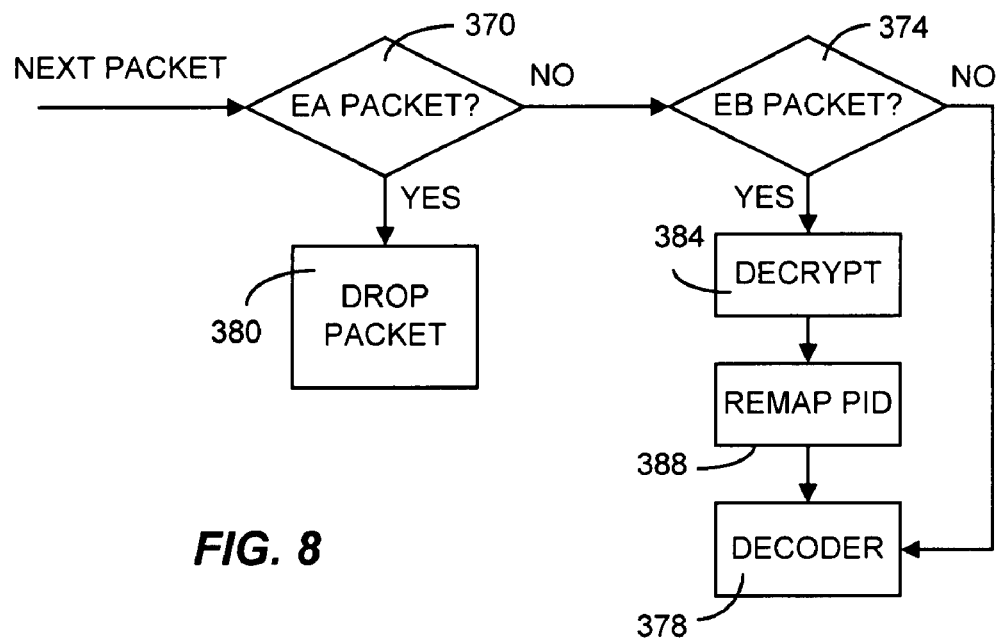
FIG. 8 is a flow chart of a decryption process consistent with certain embodiments of the present invention.

When the output data stream from 354 is received at an STB compliant with CA encryption system B such as 336 of FIG. 6, a process such as that of FIG. 8 (which is similar to that of FIG. 5) can be utilized to decrypt and decode the program. When a packet is received having either the primary or the secondary PID at 370, a determination is made as to whether the packet is clear (C) or encrypted under system A (EA) at 370 or encrypted under system B (EB) at 374. If the packet is clear, it is passed directly to the decoder 378. In some embodiments, the relative position of the primary packet, before or after, to the secondary packet may be used to signal a primary packet for replacement in the stream. A check of the scrambling state of the primary packet is not specifically required. If the packet is an EA packet, it is dropped at 380. If the packet is an EB packet, it is decrypted at 384. At this point, the secondary PID packets and/or the primary PID packets are remapped to the same PID at 388. The decrypted and clear packets are decoded at 378.

The dual partial encryption arrangement described above can greatly reduce the bandwidth requirements over that required for full dual carriage. Encrypting the PES header information can be effective in securing video and audio content, while allowing two or more CA systems to independently "co-exist" on the same cable system. Legacy system A set-top boxes are un-affected, and system B set-top boxes require only an minor hardware, firmware, or software enhancement to listen for two PIDs each for video and audio. Each type of STB, legacy and non-legacy, retains its intrinsic CA methodology. Headend modification is limited to selecting content for encryption, introducing the second encrypter, and providing a means to mix the combination into a composite output stream.

In one embodiment, the headend equipment is configured to opportunistically scramble as much of the content as the bandwidth will allow, and not just the critical PES headers. These additional scrambled packets would be either in the PES payload or other packets throughout the video/audio frame to provide even further security of the content.

SI Encryption

Figure 9:
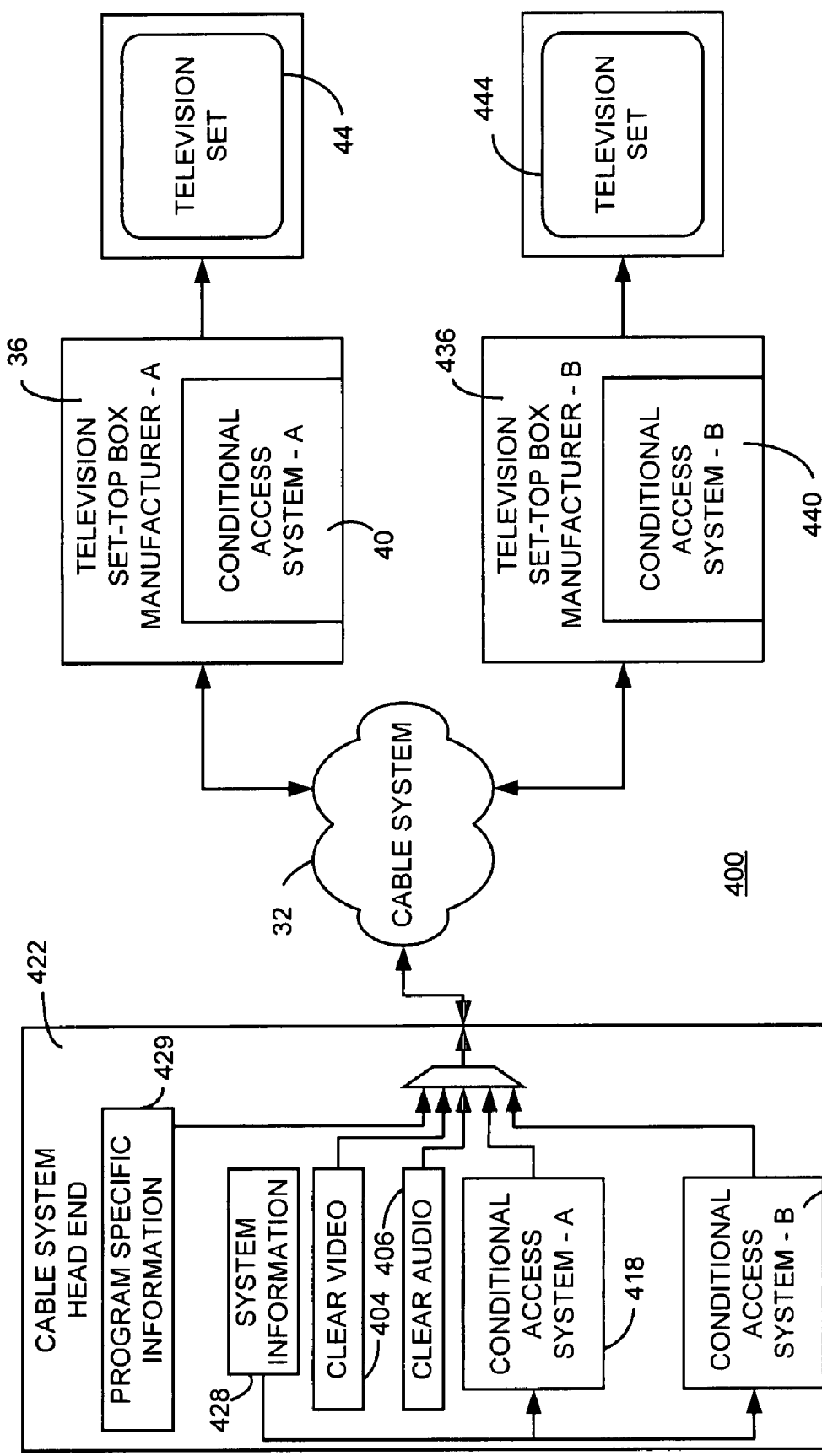
FIG. 9 is a block diagram of a system consistent with an embodiment of the present invention in which system information is encrypted and programming is sent in the clear.

Turning now to FIG. 9, one embodiment of a system that minimizes the need for any additional bandwidth is illustrated as system 400. In this embodiment, the system takes advantage of the fact that system information (SI) 428 is required for a set-top box to tune programming. In a cable system, SI is sent out-of-band, a frequency set aside from the normal viewing channels. It is possible to also send it in-band. If sent in-band, the SI 428 is replicated and sent with each stream. For discussion purposes, assume that the SI delivered to "legacy" set-top boxes from previous manufacturers is separate from the SI delivered to set-tops from new manufacturers such as STB 436. Consequently, each version of the SI can be independently scrambled as illustrated using conditional access system A 418 and conditional access system B 424. The clear video 404 and clear audio 406 are delivered in the clear, but in order to understand how to find them, the SI information 428 is needed.

The SI delivers information about channel names and program guide information such as program names and start times, etc. . . . as well as the frequency tuning information for each channel. Digital channels are multiplexed together and delivered at particular frequencies. In the embodiment of the invention, the SI information is encrypted, and only made available to authorized set-top boxes. If the SI information is not received to allow knowledge of the location of all the A/V frequencies in the plant, then tuning cannot take place.

To frustrate a hacker who might program a set-top box to trial or scan frequencies, the frequencies for the channels can be offset from the standard frequencies. Also, the frequencies can be dynamically changed on a daily, weekly or other periodic or random basis. A typical cable headend may have roughly 30 frequencies in use. Each frequency is typically chosen to avoid interference between, among other things, each other, terrestrial broadcast signals, and frequencies used by clocks of the receiving equipment. Each channel has at least one independent alternate frequency that if used would not cause interference, or cause the frequency of adjoining channels to be changed. The actual possible frequency maps are therefore $2^{30}$ or $1.07 \times 10^9$. However, a hacker might simply quickly try both frequencies on each tune attempt for each of the 30 channels or so. If successful in locating a frequency with content, the hacker's set-top box can then parse the PSI 429 to learn about the individual PIDs that make up a program. The hacker will have difficulty learning that "program 1" is "CNN", and that "program 5" is "TNN", and so on. That information is sent with the SI, which as stated above is scrambled and otherwise unavailable to the un-authorized set-top box. However, a persistent hacker might yet figure those out by selecting each one and examining the content delivered. So in order to frustrate the identification of channels, the assignment of a program within a single stream can move around, e.g. program 2 and program 5 swapped in the example above so that "program 1" is "TNN" and "program 5" is "CNN". Also, it is possible to move programs to entirely different streams with entirely new program groupings. A typical digital cable headend can deliver 250 programs of content including music. Each can be uniquely tuned. The possible combinations for re-ordering are 250! (factorial). Without a map of the content provided by either the delivered SI or by a hacker, the user is faced with randomly selecting each program in a stream to see if it is the one interest.

Thus, at headend 422, the video signal 404 and the audio signal 406 are provided in the clear (unencrypted) while the SI 428 is provided to multiple CA systems for delivery over the cable network. Thus, in the exemplary system 400, clear SI 428 is provided to an encryption system 418 that encrypts SI data using encryption system A. Simultaneously, clear SI 428 is provided to encryption system 424 that encrypts the SI data using encryption system B. Clear video 404, audio 406, and PSI 429 are then multiplexed along with encrypted SI from 418 (SI A) and encrypted SI from 424 (SI B) to replace out of band system information 428.

After distribution through the cable system 32, the video, the audio, PSI, system information A and system information B are all delivered to set-top boxes 36 and 436. At STB 36, the encrypted SI is decrypted at CA system A 40 to provide tuning information to the set-top box. The set-top box tunes a particular program to allow it to be displayed on television set 44. Similarly, at STB 436, the encrypted SI is decrypted at CA system B 440 to provide tuning information for the set-top box, to allow a particular program to be tuned and displayed on television set 444.

An advantage of this approach is that no additional A/V bandwidth is required in the content delivery system, e.g. cable system. Only the SI is dual carried. No special hardware is required. Any offset frequencies from the standard ones can be easily accommodated by most tuners. SI decryption can be performed in software or can be aided by hardware. For example, legacy Motorola set-top boxes have an ability to descramble the SI delivered to the Motorola set-top boxes out-of-band using a hardware decrypter built into the decoder IC chip.

A determined hacker can potentially use a spectrum analyzer on the coax cable to learn where the A/V channels are located. Also, it may be possible for the hacker to program a set-top box to auto-scan the frequency band to learn where the AN channels are—a relatively slow process. If the A/V channel frequencies changed dynamically, then that could foil the hackers, since they would need to be constantly analyzing or scanning the band. Also, the program numbers and assigned PIDs can vary. However, dynamically changing frequencies, program numbers, and PIDs might create operational difficulties to a service provider, e.g. cable operator.

Generalized Representation

Figure 10:
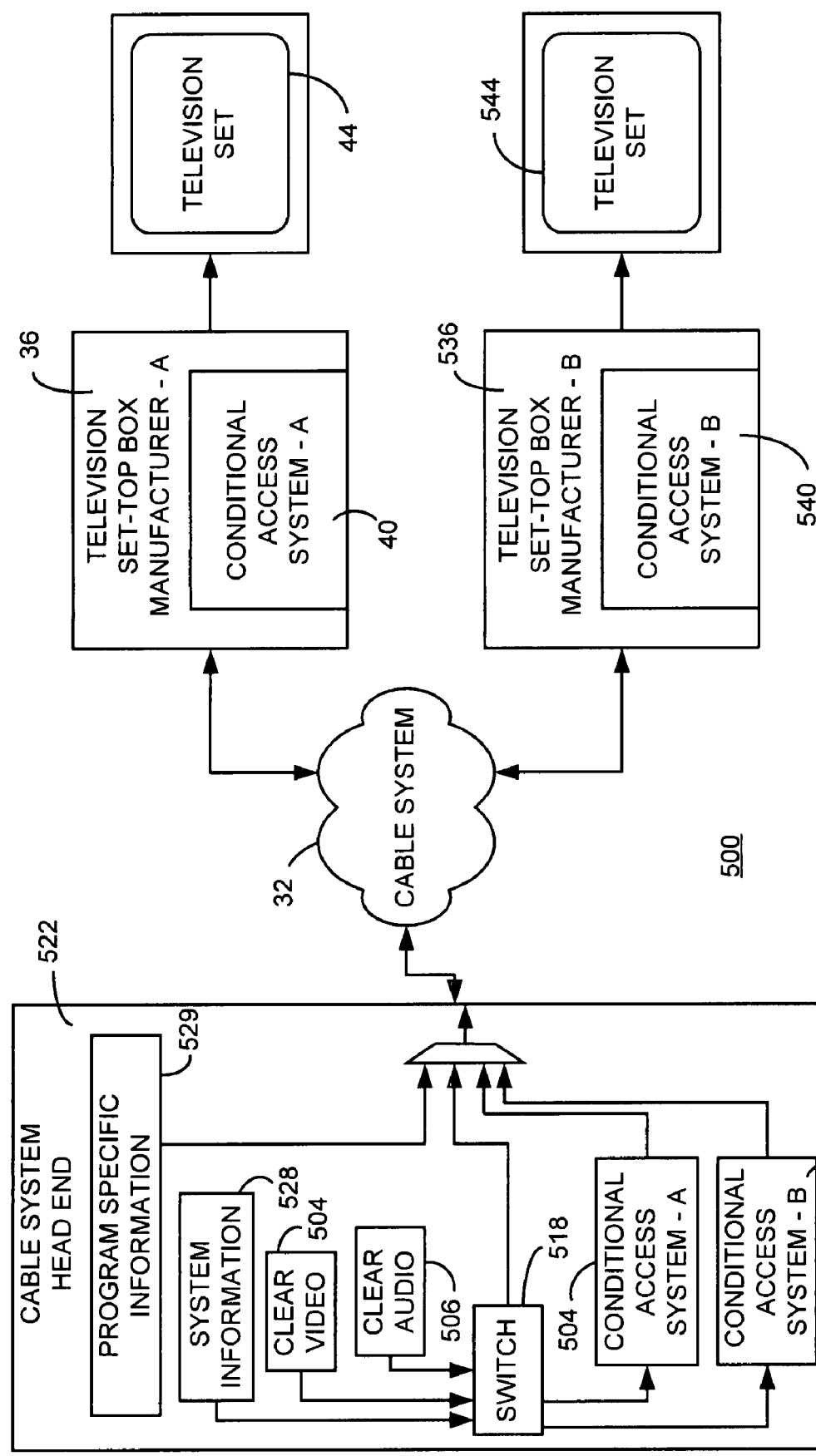
FIG. 10 is a block diagram of a generic system consistent with various embodiments of the present invention.

Each of the above techniques can be represented generically by the system 500 of FIG. 10. This system 500 has a cable system headend 522 with clear video 504, clear audio 506, SI 528, and PSI 529 any of which can be selectively switched through an intelligent processor controlled switch 518, which also serves to assign PIDs (in embodiments requiring PID assignment or reassignment), to conditional access system A 520 or conditional access system B 524 or passed in the clear to the cable system 32. As previously, the program or SI encrypted according to the legacy CA system A can be properly decoded by STB 36. The CA system B encrypted information is understood by STBs 536 and decrypted and decoded accordingly, as described previously.

PID Mapping Considerations

The PID mapping concepts described above can be generally applied to the dual partial encryption techniques described herein, where needed. At the cable headend, the general concept is that a data stream of packets is manipulated to duplicate packets selected for encryption. Those packets are duplicated and encrypted under two distinct encryption methods. The duplicated packets are assigned separate PIDs (one of which matches the legacy CA PID used for clear content) and reinserted in the location of the original selected packet in the data stream for transmission over the cable system. At the output of the cable system headend, a stream of packets appears with the legacy encrypted packets and clear packets having the same PID. A secondary PID identifies the packets that are encrypted under the new encryption system. In addition to the PID remapping that takes place at the headend, MPEG packets utilize a continuity counter to maintain the appropriate sequence of the packets. In order to assure proper decoding, this continuity counter should be properly maintained during creation of the packetized data stream at the headend. This is accomplished by assuring that packets with each PID are assigned continuity counters sequentially in a normal manner. Thus, packets with the secondary PID will carry a separate continuity counter from those of the primary PID. This is illustrated below in simplified form where PID 025 is the primary PID and PID 125 is the secondary PID, E represents an encrypted packet, C represents a clear packet, and the end number represents a continuity counter.

| 025C04 | 025E05 | 125E11 | 025C06 | 025C07 | 025C08 | 025C09 | 025E10 | 125E12 |

In this exemplary segment of packets, packets with PID 025 are seen to have their own sequence of continuity counters (04, 05, 06, 07, 08, 09, . . . ). Similarly, the packets with secondary PID 125 also have their own sequence of continuity counters (11, 12, . . . ).

At the STB, the PIDs can be manipulated in any number of ways to correctly associate the encrypted packets with secondary PID with the correct program. In one implementation, the packet headers of an input stream segment illustrated below:

| 025C04 | 025E05 | 125E11 | 025C06 | 025C07 | 025C08 | 025C09 | 025E10 | 125E12 | are manipulated to create the following output stream segment:

| 125C04 | 025E11 | 125E05 | 125C06 | 125C07 | 125C08 | 125C09 | 025E12 | 125E10 |

The primary PIDs (025) in the input stream are replaced with the secondary PID (125) for the clear packets (C). For the encrypted packets, the primary PID and secondary PID are retained, but the continuity counters are swapped. Thus, the stream of packets can now be properly decrypted and decoded without errors caused by loss of continuity using the secondary PID. Other methods for manipulation of the PIDs, e.g. mapping the PID (125) on the scrambled legacy packet to a NOP PID (all ones) or other PID value not decoded, and the continuity counters can also be used in embodiments consistent with the present invention.

The primary and secondary PIDs are conveyed to the STBs in the program map table (PMT) transmitted as a part of the program specific information (PSI) data stream. The existence of a secondary PID can be established to be ignored by the STB operating under CA encryption system A (the "legacy" system), but new STBs operating under CA encryption system B are programmed to recognize that secondary PIDs are used to convey the encrypted part of the program associated with the primary PID. The set-top boxes are alerted to the fact that this encryption scheme is being used by the presence of a CA descriptor in the elementary PID "for loop" of the PMT. There typically would be a CA descriptor for the video elementary PID "for loop", and another one in the audio elementary PID "for loop". The CA descriptor uses a Private Data Byte to identify the CA_PID as either the ECM PID or the secondary PID used for partial scrambling, thus setting up the STB operating under system B to look for both primary and secondary PIDs associated with a single program. Since the PID field in the transport header is thirteen bits in length, there are $2^{13}$ or 8,192 PIDs available for use, any spare PIDs can be utilized for the secondary PIDs as required.

In addition to the assignment of a PID for each program component or selected portion thereof, a new PID may be assigned to tag ECM data used in the second encryption technique. Each PID number assigned can be noted as a user defined stream type to prevent disrupting operation of a legacy STB. MPEG defines a reserved block of such numbers for user defined data stream types.

While conceptually the PID mapping at the cable headend is a simple operation, in practice the cable headend equipment is often already established and is therefore modified to accomplish this task in a manner that is minimally disruptive to the established cable system while being cost effective. Thus, the details of the actual implementation within the cable system headend are somewhat dependent upon the actual legacy hardware present in the headend, examples of which are described in greater detail below.

Headend Implementations

Those skilled in the art will appreciate that the above descriptions as related to FIGS. 2, 3, 6, 9 and 10 are somewhat conceptual in nature and are used to explain the overall ideas and concepts associated with the various embodiments of the present invention. In realizing a real world implementation of the present invention, those skilled in the art will recognize that a significant real world issue to contend with is providing a cost effective implementation of the various partial encryption methods within existing legacy headend equipment at established cable providers. Taking two of the primary legacy cable systems as examples, the following describes how the above techniques can be implemented at a cable headend.

First, consider a cable system headend using a Motorola brand conditional access system. In such a system the modifications shown in FIG. 11 can be done to provide a cost effective mechanism for partial dual encryption implementation. In a typical Motorola system, a HITS (Headend In The Sky) or similar data feed is provided from a satellite. This feed provides aggregated digitized content that is supplied to cable providers and is received by a receiver/descrambler/scrambler system 604 such as the Motorola Integrated Receiver Transcoder (IRT) models IRT 1000 and IRT 2000, and Motorola Modular Processing System (MPS). A clear stream of digitized television data can be obtained from the satellite descrambler functional block 606 of the receiver/descrambler/scrambler 604. This clear stream can be manipulated by a new functional block shown as packet selector/duplicator 610. This new block 610 may be implemented as a programmed processor or may be otherwise implemented in hardware, software or a combination thereof.

Packet selector/duplicator 610 selects packets that are to be dual encrypted under any of the above partial dual encryption methods. Those packets are then duplicated with new PIDs so that they can be later identified for encryption. For example, if packets at the input of 610 associated with a particular program have PID A, then packet selector/duplicator 610 identifies packets to be encrypted and duplicates those packets and remaps them to PIDs B and C respectively, so that they can be identified later for encryption under two different systems. Preferably, the duplicate packets are inserted into the data stream adjacent one another in the location of the originally duplicated packet now with PIDs B and C so that they remain in the same order originally presented (except that there are two packets where one previously resided in the data stream). Assume, for the moment, that the new CA system to be added is NDS encryption. In this case, PID A will represent clear packets, PID B will represent NDS encrypted packets and PID C will represent Motorola encrypted packets. The packets having PID B may be encrypted under the NDS encryption at this point in 610 or may be encrypted later.

The packets with PIDs B and C are then returned to the system 604 where packets with PID C are encrypted under Motorola encryption at cable scrambler 612 as instructed by the control system 614 associated with the Motorola equipment. The output stream from cable scrambler 612 then proceeds to another new device—PID remapper and scrambler 620, which receives the output stream from 612 and now remaps the remaining packets with PID A to PID C and encrypts the PID B packets under the NDS encryption algorithm under control of control system 624. The output stream at 626 has clear unencrypted packets with PID C and selected packets which have been duplicated and encrypted under the Motorola encryption system with PID C along with encrypted packets under the NDS encryption system with PID B. This stream is then modulated (e.g., Quadrature Amplitude Modulated and RF modulated) at 628 for distribution over the cable system. The preferred embodiment maps the unencrypted packets on PID A to match the scrambled packets on PID C because the audio and video PIDs called out in legacy program specific information (PSI) are correct that way. The control computer, the scrambler, and legacy set-top boxes only know about PID C. Alternatively, the scrambled packets on PID C could be mapped back to PID A, but this would likely mean editing the PSI, that was automatically generated, to map the PID numbers from PID C back to PID A in the PID remapper and scrambler 620. In the above example, the PID remapper and scrambler 620 may also be used to demultiplex PSI information, modify it to reflect the addition of the NDS encryption (through the use of CA descriptors in the PMT) and multiplex the modified PSI information back into the data stream. The ECMs to support NDS encryption may also be inserted into the data stream at PID remapper and scrambler 620 (or could be inserted by packet selector/duplicator 610).

Thus, in order to add NDS encryption (or another encryption system) to a cable system headend using Motorola equipment, packets are duplicated and PIDs are remapped in the data stream from the satellite descrambler. The remapped PIDs are then used to identify packets that are to be scrambled under each CA system. Once the legacy system encryption has taken place, the clear PID is then remapped so that both clear and encrypted packets in the legacy system share the same PID (or PIDs). PID remapping as in 620 and packet selection and duplication as in 610 can be implemented using a programmed processor or using custom or semi-custom integrated circuitry such as an application specific integrated circuit or a programmable logic device or field programmable gate array. Other implementations are also possible without departing from the present invention.

Figure 12:
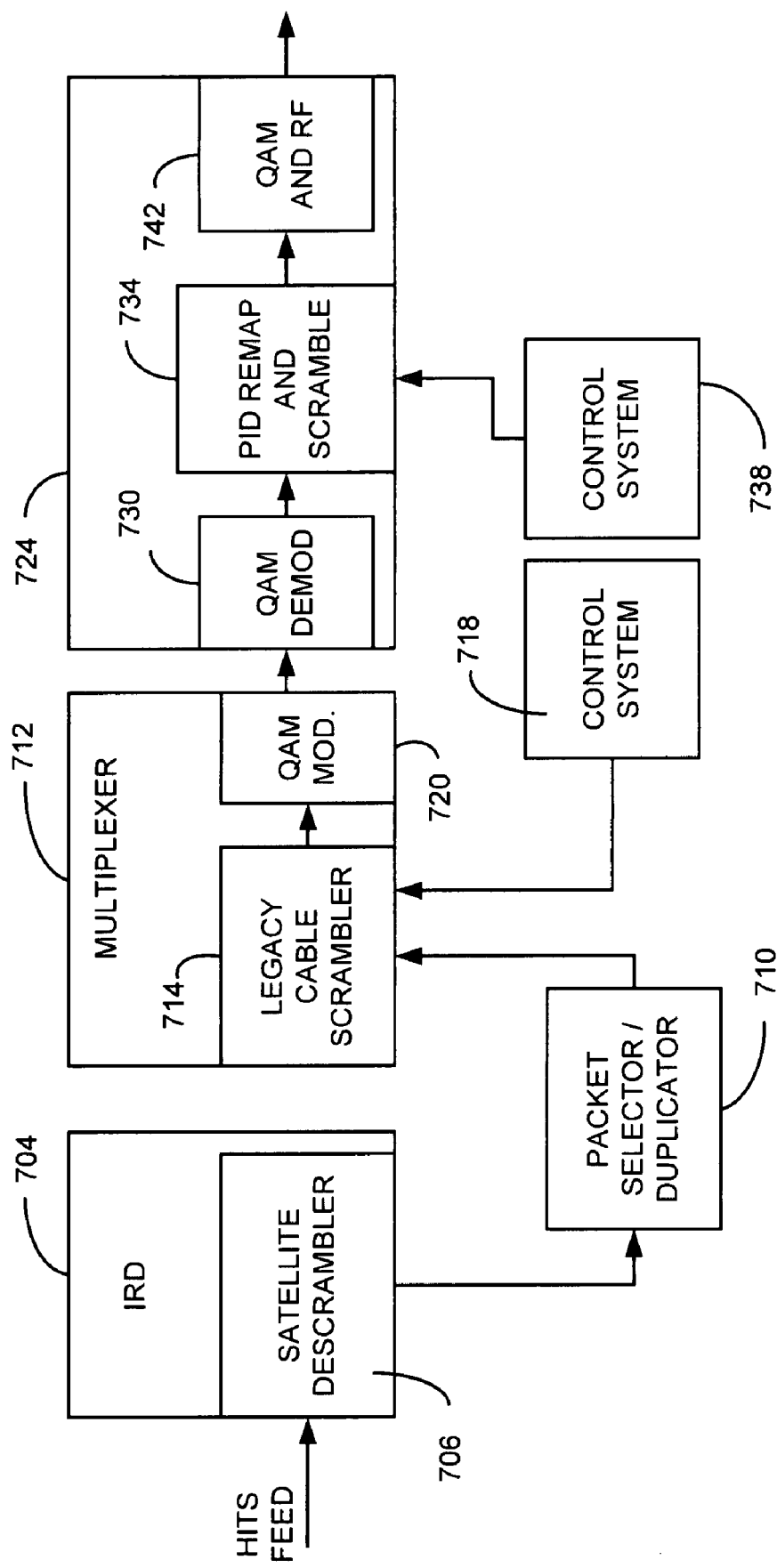
FIG. 12 is a block diagram of a second embodiment of implementation of an encryption system consistent with embodiments of the present invention in a cable system headend.

FIG. 12 depicts a similar equipment configuration such as that used in implementing the partial dual encryption of the present invention in a Scientific Atlanta based cable headend. In this embodiment, the HITS feed or similar is received at IRD 704 which incorporates a satellite descrambler 706. This may be a Motorola IRT or MPS with only the satellite descrambler function enabled. The output of the satellite descrambler 706 again provides a clear data stream that can be manipulated by a new packet selector/duplicator 710 which selects packets to be encrypted, duplicates them and maps the PIDs of the duplicate packets to new PIDs. Again, for example, packets to remain in the clear are assigned PID A, packets to be encrypted under the new system (e.g., NDS) are assigned PID B and packets to be encrypted under the Scientific Atlanta encryption system are assigned PID C. The packets with PID B may be encrypted at this point under the NDS encryption system.

The stream of packets is then sent to a multiplexer 712 (e.g., a Scientific Atlanta multiplexer) where the packets having PID C are encrypted under the Scientific Atlanta encryption system at 714 under control of control system 718 associated with multiplexer 712. The stream of data is then supplied internal to multiplexer 712 to a QAM modulator 720. In order to properly remap the packets, the QAM modulated signal at the output of multiplexer 712 is provided to a new processor system 724 where the QAM modulated signal is demodulated at a QAM demodulator 730 and the clear PID A packets are remapped to PID C at PID remapper 734 under control of a control system 738. Encryption under the NDS encryption algorithm can also be carried out here rather than in 710. The data stream with remapped PIDs and dual partial encryption is then QAM and RF modulated at 742 for distribution over the cable system.

In the above example, the PID remapper and scrambler 734 may also be used to demultiplex PSI information, modify it to reflect the addition of the NDS encryption (adding the CA descriptors to the PMT) and multiplex the modified PSI information back into the data stream. The ECMs to support NDS encryption may also be inserted into the data stream at PID remapper and scrambler 734 (or could be inserted by packet selector/duplicator 710). PID remapping and or scrambling as in 734 along with QAM demodulation and QAM modulation as in 730 and 742 respectively, and packet selection and duplication as in 710 can be implemented using a programmed processor or using custom or semi-custom integrated circuitry such as an application specific integrated circuit or a programmable logic device or field programmable gate array. Other implementations are also possible without departing from the present invention.

The above embodiments of the present invention allow legacy scrambling equipment to scramble only the packets desired in an elementary stream instead of the entire elementary stream. The scrambling of certain packets of an elementary stream is accomplished by using a PID number for packets that are not going to be scrambled, e.g., PID A. Packets that will be scrambled will be placed on PID C. The scrambling equipment will scramble the packets on PID C (the ones that have been selected for scrambling). After the scrambling has taken place, the unscrambled packets have the PID number mapped to the same as the scrambled packet—PID A becomes PID C. The legacy set-top boxes will receive an elementary stream with both scrambled and un-scrambled packets.

The packets in these embodiments are handled as a stream. The entire stream is sent to the legacy scrambling equipment for scrambling. This keeps all of the packets in exact time synchronous order. If packets were extracted from a stream and sent to the legacy scrambling equipment, time jitter might be introduced. The present embodiment avoids that problem by keeping all the packets in a stream. The embodiment does not require cooperation from the legacy scrambling equipment provider because that equipment is not involved in the remapping of packets—from PID A to PID C. This remapping is preferable because the PID called out by the PSI generated by the legacy scrambling system does not need to change. The legacy system knows about PID C, but not PID A. The entire elementary stream to be scrambled by the legacy scrambling equipment is found on a single PID that the scrambling system has been instructed to scramble.

In the above examples, the use of NDS as the second encryption system should not be considered limiting. Moreover, although two widely used systems—Motorola and Scientific Atlanta have been depicted by way of example, similar modifications to legacy systems to permit PID remapping and dual partial encryption can be used. In general, the technique described above involves the process generally described as 800 in FIG. 13. A feed is received at 806 which is descrambled as it is received at 810 to produce a clear data stream of packets. At 814, packets are selected according to the desired partial dual encryption technique (e.g., audio only, packets containing PES header, etc.). At 818, the selected packets are duplicated and the duplicate pairs are remapped to two new PIDs (e.g., PID B and PID C). The duplicated packets are then encrypted based upon PID (that is, PID C is encrypted according to legacy encryption and PID B is encrypted according to the new encryption system) at 822. The clear packets (e.g., PID A) are then remapped to the same PID as the legacy encrypted PID (PID C) at 826.

Figure 11:
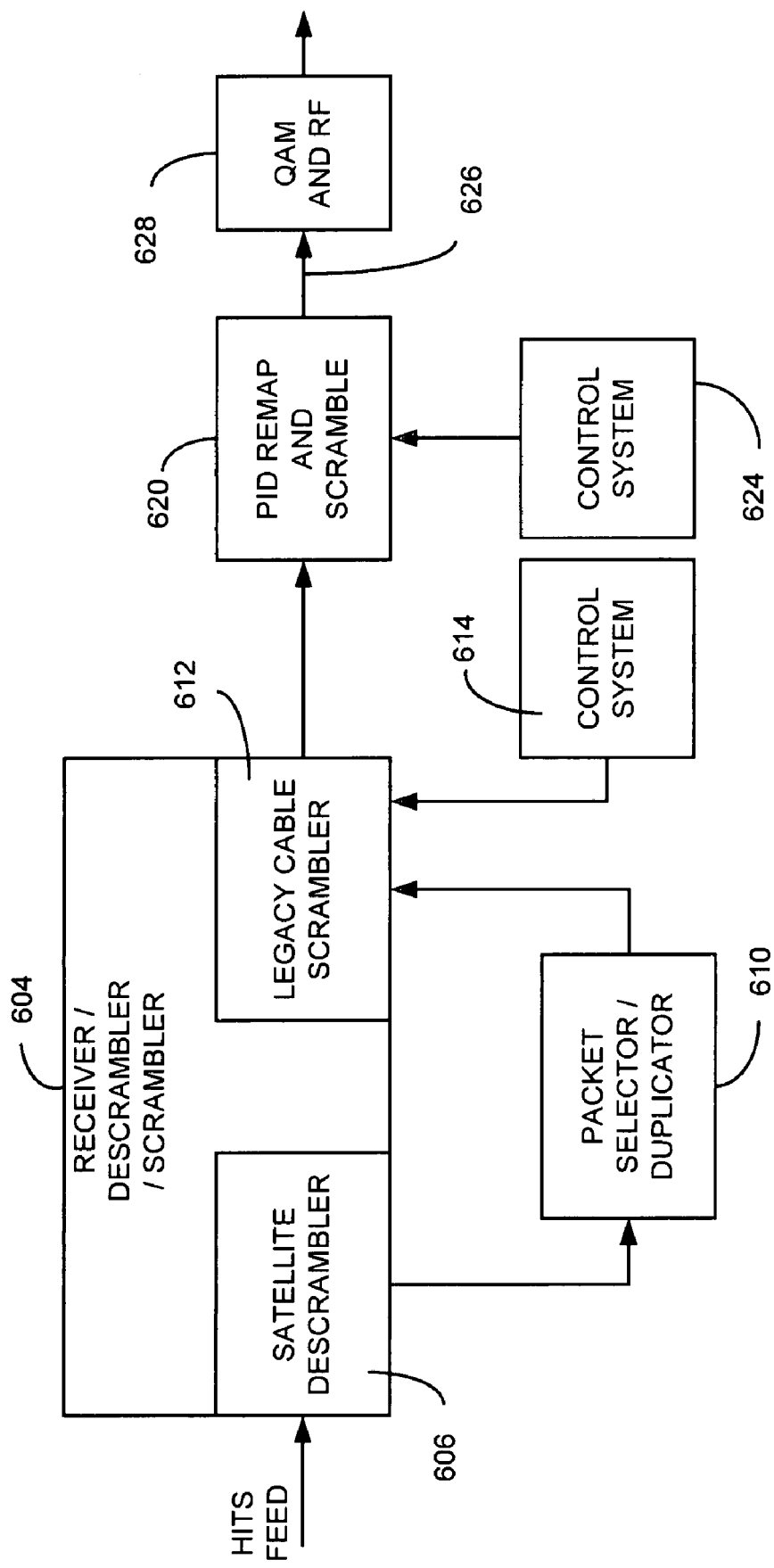
FIG. 11 is a block diagram of a first embodiment of implementation of an encryption system consistent with embodiments of the present invention in a cable system headend.
Figure 13:
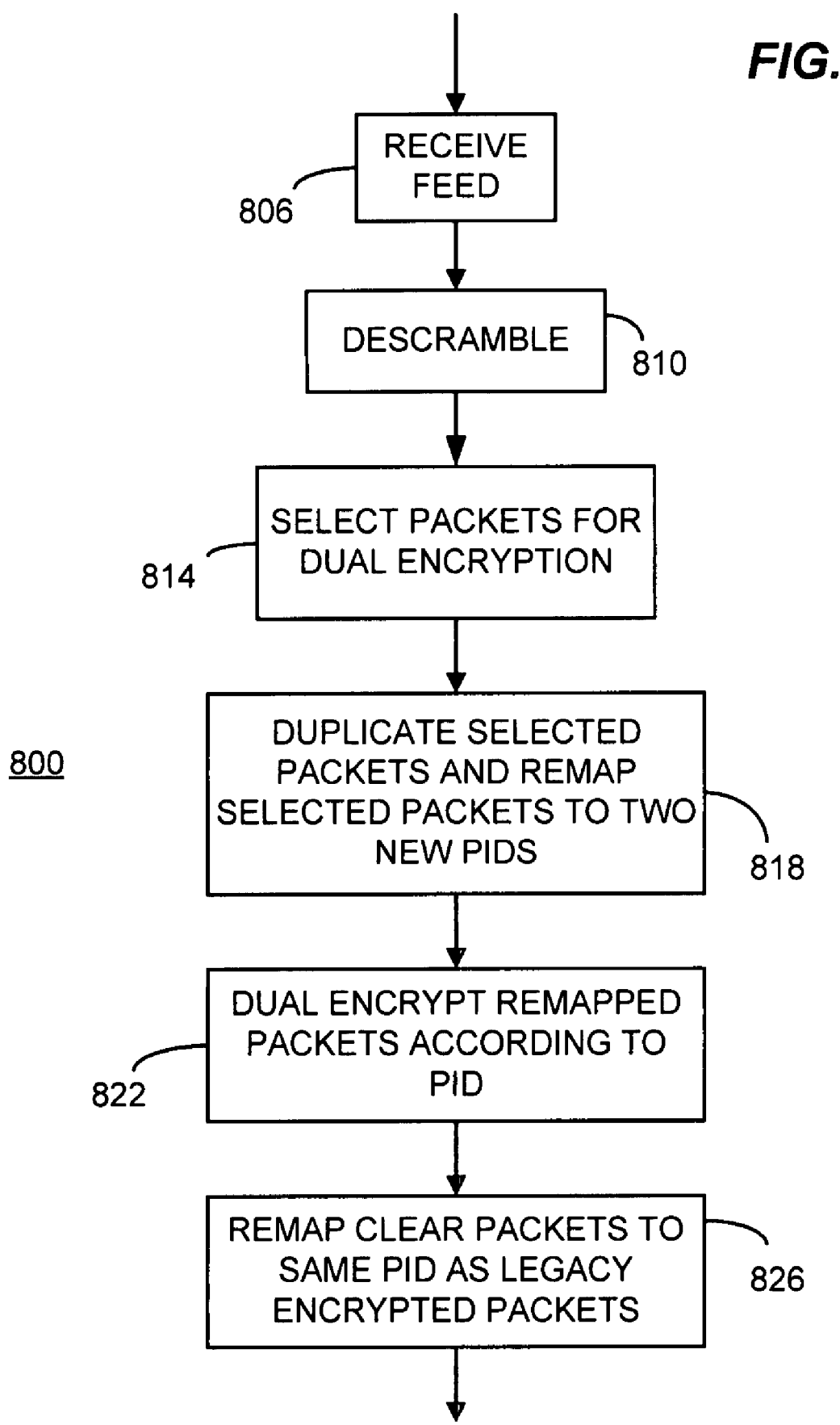
FIG. 13 is a flow chart of an overall encryption process used to implement certain embodiments of the present invention in a cable system headend.

The order in which some of the elements of the process of FIG. 13 are carried out can vary according to the particular legacy system being modified to accommodate the particular dual encryption arrangement being used. For example, encryption under a new encryption system can be carried out either at the time of duplication or later at the time of remapping the legacy packets, as illustrated in FIGS. 11 and 12. Additionally, various demodulation and re-modulation operations can be carried out as needed to accommodate the particular legacy system at hand (not shown in FIG. 13).

Set-Top Box Implementations

Several set-top box implementations are possible within the scope of the present invention. The method used at the headend to select packets for encryption is irrelevant to the STB.

Figure 14:
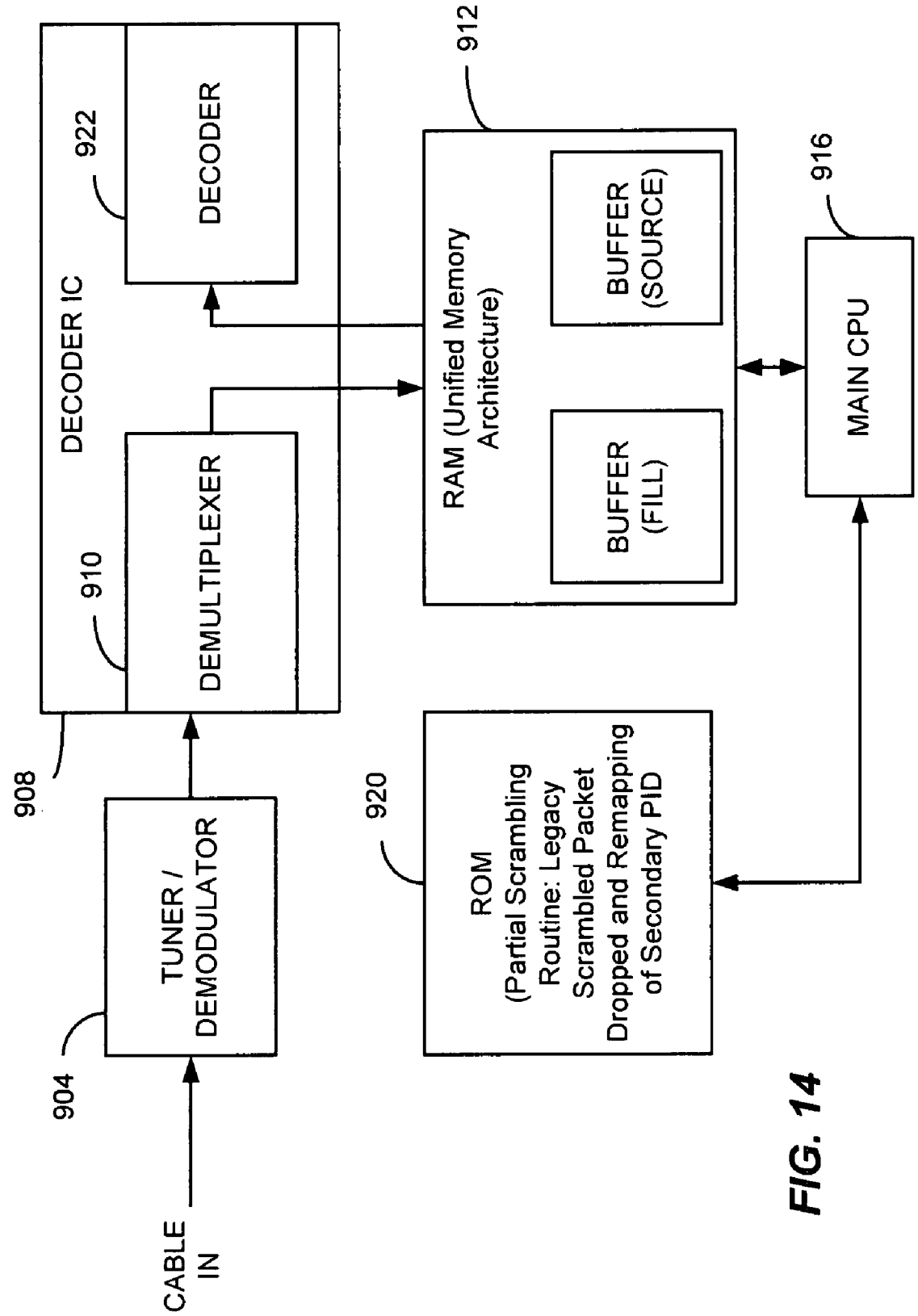
FIG. 14 is a block diagram of a first embodiment of a set-top box implementation of a decoding system consistent with embodiments of the present invention.

One such implementation is illustrated in FIG. 14. In this embodiment, packets from a tuner and demodulator 904 are provided to a decoder circuit 908's demultiplexer 910. The packets are buffered into a memory 912 (e.g., using a unified memory architecture) and processed by the STB's main CPU 916 using software stored in ROM memory 920.

Selected PIDs can be stripped from the incoming transport via the STB's PID filter, decrypted and buffered in Synchronous Dynamic Random Access Memory (SDRAM), similar to the initial processing required in preparation for transfer to a hard disk drive (HDD) in a Personal Video Recorder (PVR) application. The host CPU 916 can then "manually" filter the buffered data in SDRAM for elimination of the packets containing unneeded PIDs. There are some obvious side effects to this process.

The host overhead is estimated to be about 1% of the bandwidth of the CPU. In the worst case, this is equivalent to 40K bytes/Second for a 15 Mbit/S video stream. This reduction is possible since at most only 4 bytes of each packet is evaluated and the location is on 188 byte intervals so the intervening data does not have to be considered. Each packet header in SDRAM can therefore be directly accessed through simple memory pointer manipulation. Additionally, Packets are cached in blocks and evaluated en masse to reduce task switching of the host. This would eliminate an interrupt to other tasks upon the reception of each new packet. This may produce a increased latency for starting decode of a stream upon channel change to allow time for cache fill. This may be negligible depending upon the allocated SDRAM cache buffer size.

The host filtered packets in the SDRAM buffer are then transferred to the A/V Queue through existing hardware DMA processes and mimics a PVR implementation. The filtered packets are then provided to the decoder 922 for decoding.

Figure 15:
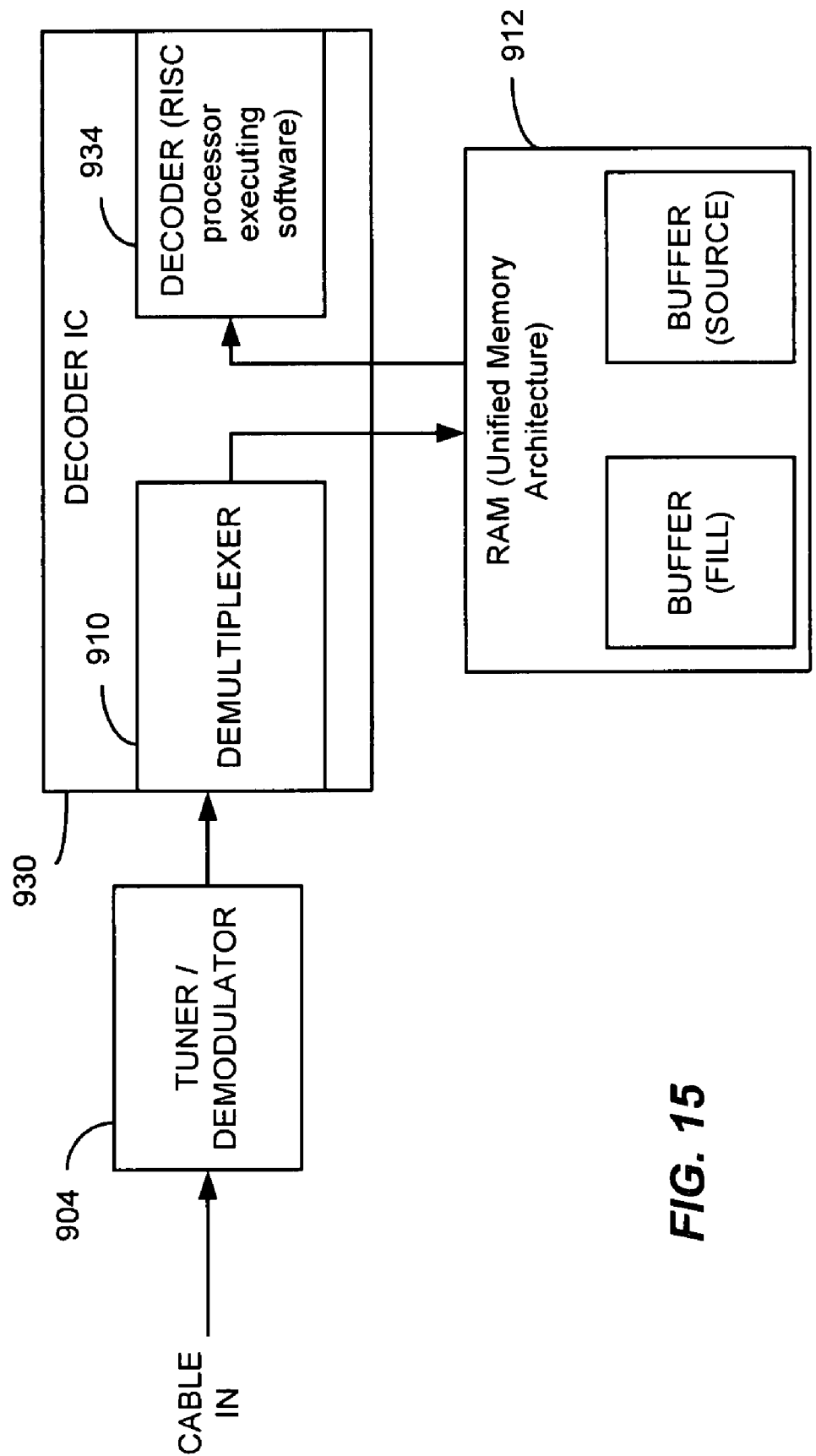
FIG. 15 is a block diagram of a second embodiment of implementation of a decoding system consistent with embodiments of the present invention in a cable system STB.

A second technique for implementation in a set-top box is illustrated in FIG. 15. Since RISC processor A/V decoder module 934 in decoder circuit 930 processes the partial transport PIDs and strips/concatenates for decode, the firmware within decoder IC 930 can be altered to exclude individual packets in a partial transport stream based upon criteria in each packet header. Alternatively, the demultiplexer 910 can be designed to exclude the packets. Legacy scrambled packet(s) pass through the CA module still encrypted. By using the decoder IC 930 to perform the removal of the legacy scrambled packets and assuming that the packets encrypted under the new encryption algorithm (e.g., NDS) are immediately adjacent the legacy encrypted packet (or at least prior to next primary stream video packet) then the pruning of the legacy packet in effect accomplishes the merging of a single, clear stream into the header strip and video queue.

Figure 16:
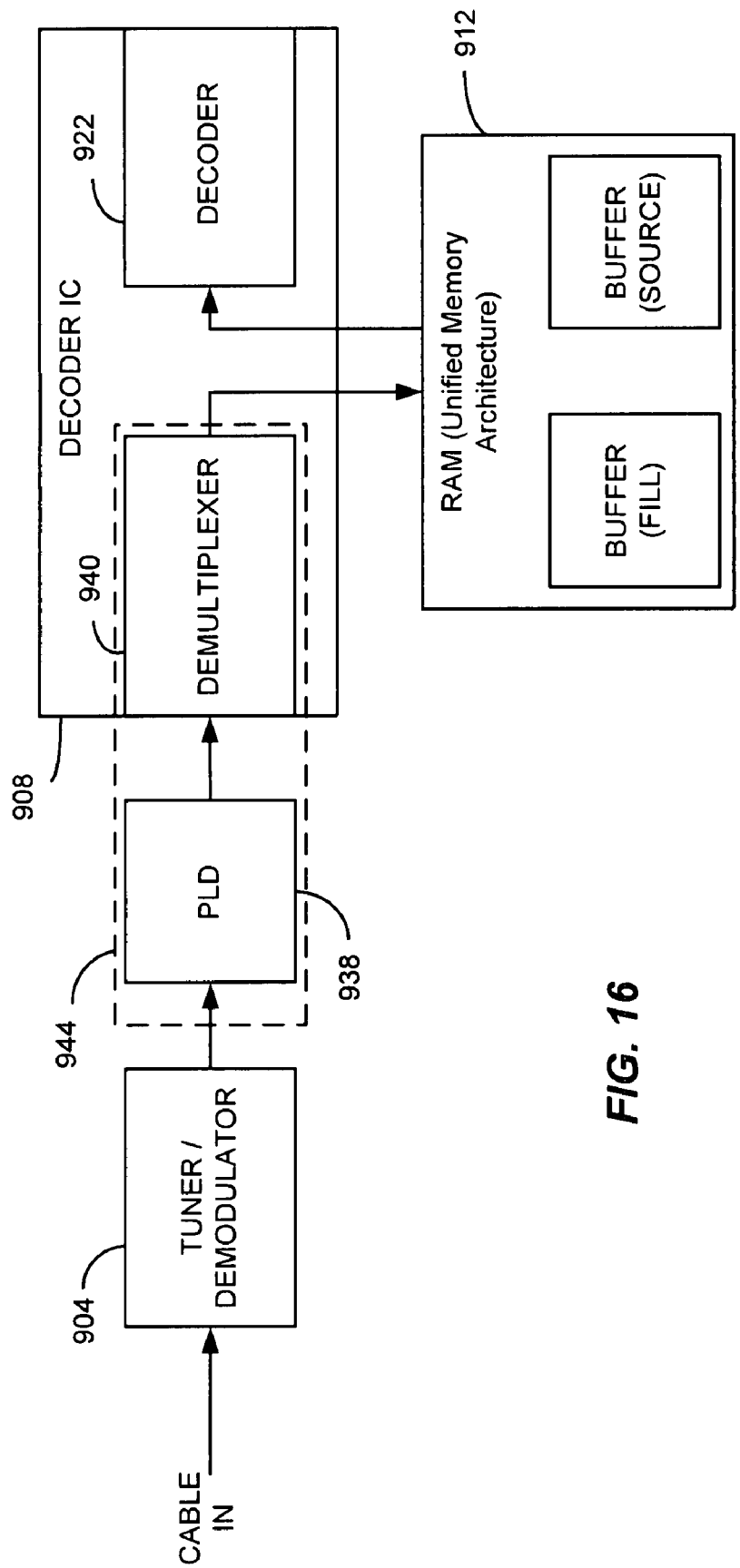
FIG. 16 is a block diagram of a third embodiment of implementation of a decoding system consistent with embodiments of the present invention in a cable system STB.

A third technique for implementation of partial decryption in a set-top box is illustrated in FIG. 16. In this embodiment, the PID remapping is carried out either within a circuit such as an Application Specific Integrated Circuit (ASIC), Field Programmable Gate Array (FPGA), or a programmable logic device (PLD) 938 or other custom designed circuit placed between the tuner and demodulator 904 and the decoder IC 908. In a variation of this embodiment, the decoder IC 908 can be modified to implement the PID remapping within demultiplexer 940. In either case, the legacy encrypted packets are dropped and the non-legacy packets are re-mapped either in circuit 938 or demultiplexer 940.

Figure 17:
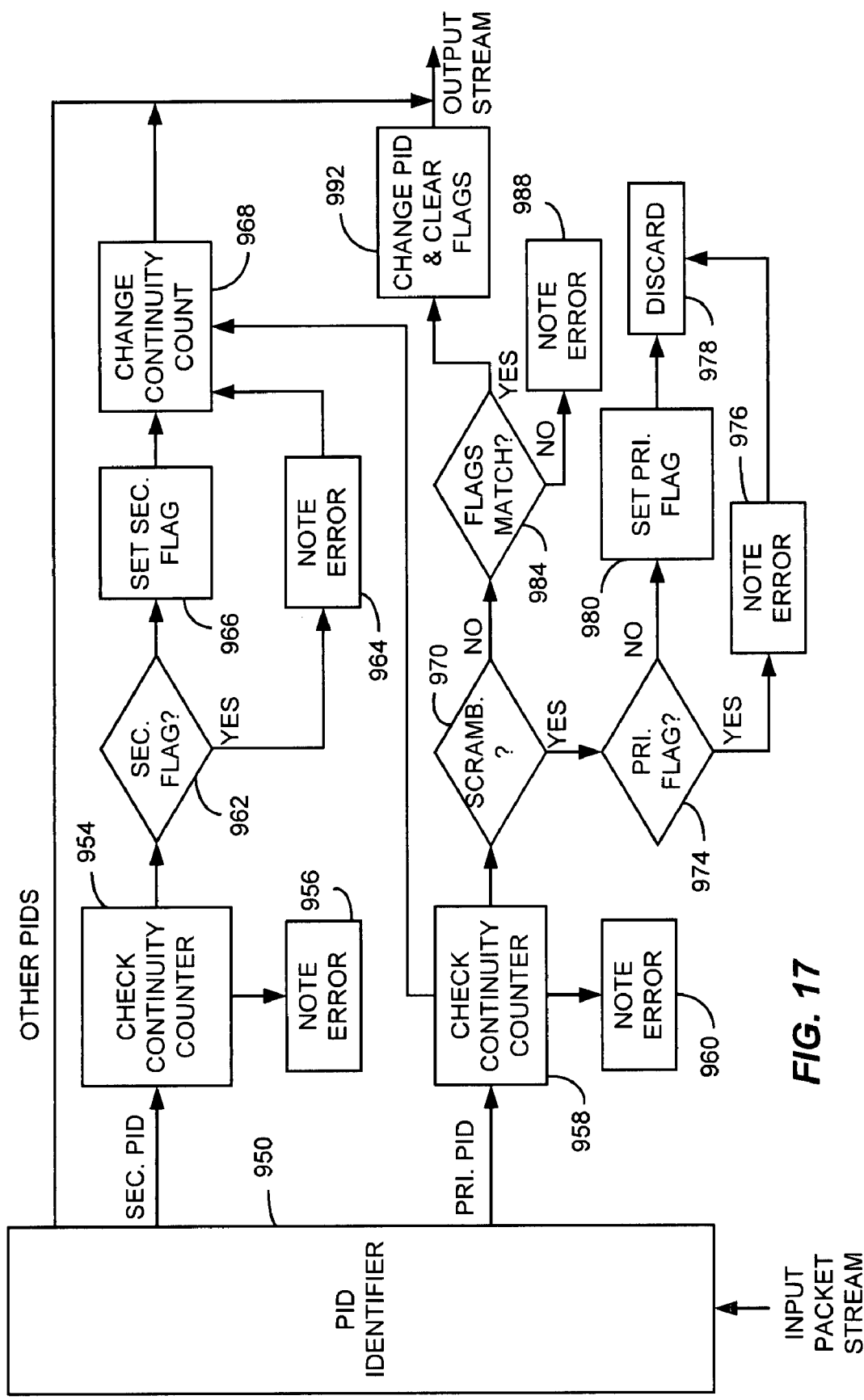
FIG. 17 illustrates the PID remapping process carried out in one embodiment of a set-top box PID re-mapper.

This third technique can be implemented in one embodiment using the PLD depicted in FIG. 17. This implementation assumes that there will not be more than one encrypted packet of a particular PID appearing in a row, thus, the implementation could be modified to accommodate bursts of encrypted packets such as with the M and $N^{th}$ encryption arrangement described above (as will be explained later). The input stream passes through a PID identifier 950 which serves to demultiplex the input stream based upon PID. Primary PID packets are checked for continuity at 958. If a continuity error is detected, the error is noted and the counter is reset at 960.

The original input packet stream contains packets tagged with many PIDs. The PID identifier 950 separates packets with the two PIDs of interest (primary and secondary PIDs) from all other packets. This capability can be scaled to process multiple PID pairs. These other packets are bypassed directly to the revised output stream. This processing results in a three or four byte clocking delay.

Packets with the secondary PID are routed by the PID identifier 950 to a continuity count checker 954 which verifies sequence integrity for this PID. Any errors are noted at 956, but specific handling of errors is not relevant to understanding the present invention. The packet's continuity value is preserved for use in checking the sequence of packets to follow. A corresponding continuity check 958 is done for packets with the primary PID using the independent primary counter, and again any errors are noted at 960.

The secondary packet is checked for a secondary flag at 962. This Boolean indicator is used to remember if a secondary packet has been processed since the last clear packet. More than one secondary packet between clear packets is an error in this embodiment and is noted at 964. Presence of a secondary packet is remembered by setting the secondary flag at 966.

The continuity counter of the secondary packet is changed at 968 to fit into the sequence of the clear packets. Data for this substitution comes from the value used to verify continuity of the primary stream at 958. The revised packet is sent out from 968 and merged into the revised stream forming the output stream.

After packets with primary PIDs have had their continuity checked at 958, they are differentiated at 970 by the scrambling flags in the header. If the packet is scrambled, the primary flag is queried at 974. This primary flag Boolean indicator is used to remember if a primary encrypted packet has been processed since the last clear packet. More than one encrypted primary packet between clear packets is an error in this embodiment and is noted at 976 before the packet is discarded at 978. Presence of a encrypted primary packet is remembered by setting the primary flag at 980. If there is no downstream consumer for the primary encrypted packet, it can be discarded at 978. In some cases it may be necessary for the packet to continue on (in which case its continuity counter can use the discarded secondary continuity value).

If the primary PID scramble test at 970 detects a clear packet, the state of the secondary and primary flags is tested at 984. Valid conditions are neither set and both set, since encrypted packets should come in matched pairs. A sequence of one without the other should be noted as an error at 988. However, the order of appearance is inconsequential in this embodiment. It should be noted that there may be other ways to flag a primary packet for deletion other than the scrambling bits in the transport header, e.g. the transport priority bit. Also, it is possible not to use any bits what-so-ever, e.g. using the primary packet's simple positional information, before or after the secondary packet, as an indicator for replacement.

Clear packets with the primary PID then have their PID value changed at 992 to the secondary PID before being output in the revised output stream. Alternatively, the secondary PID packets can be remapped to the primary PID value. The content can be decoded when the decoder is provided with the correct PID for decoding the content (whether the primary or secondary PID). Presence of a clear packet also clears the primary and secondary Boolean flags.

In all the embodiments proposed, the secondary packet can be inserted adjoining the primary packet to be replaced even when a series of primary packets are tagged for replacement. However, in some instances, it may facilitate headend partial scrambling if multiple encrypted packets can be inserted into the stream without the intervening secondary packets. In order to accommodate multiple consecutive encrypted packets (such as with the $M^{th}$ and N partial encryption method), the use of primary and secondary flags can be replaced with a counter matching test function. Thus, in place of elements 962, 964 and 966, a secondary encrypted packet counter can be incremented. In place of elements 970, 974, 976 and 980, a primary encrypted packet counter can be incremented. Element 984 can be replaced with a comparison of the primary and secondary encrypted packet counters to assure that the same number of encrypted packets are received in both the primary and secondary paths. Instead of clearing flags at 992, the counters are cleared. Using this variation, multiple encrypted packets may be consecutively received and the number received are compared to monitor the integrity of the data stream. Other variations will occur to those skilled in the art.

Figure 18:
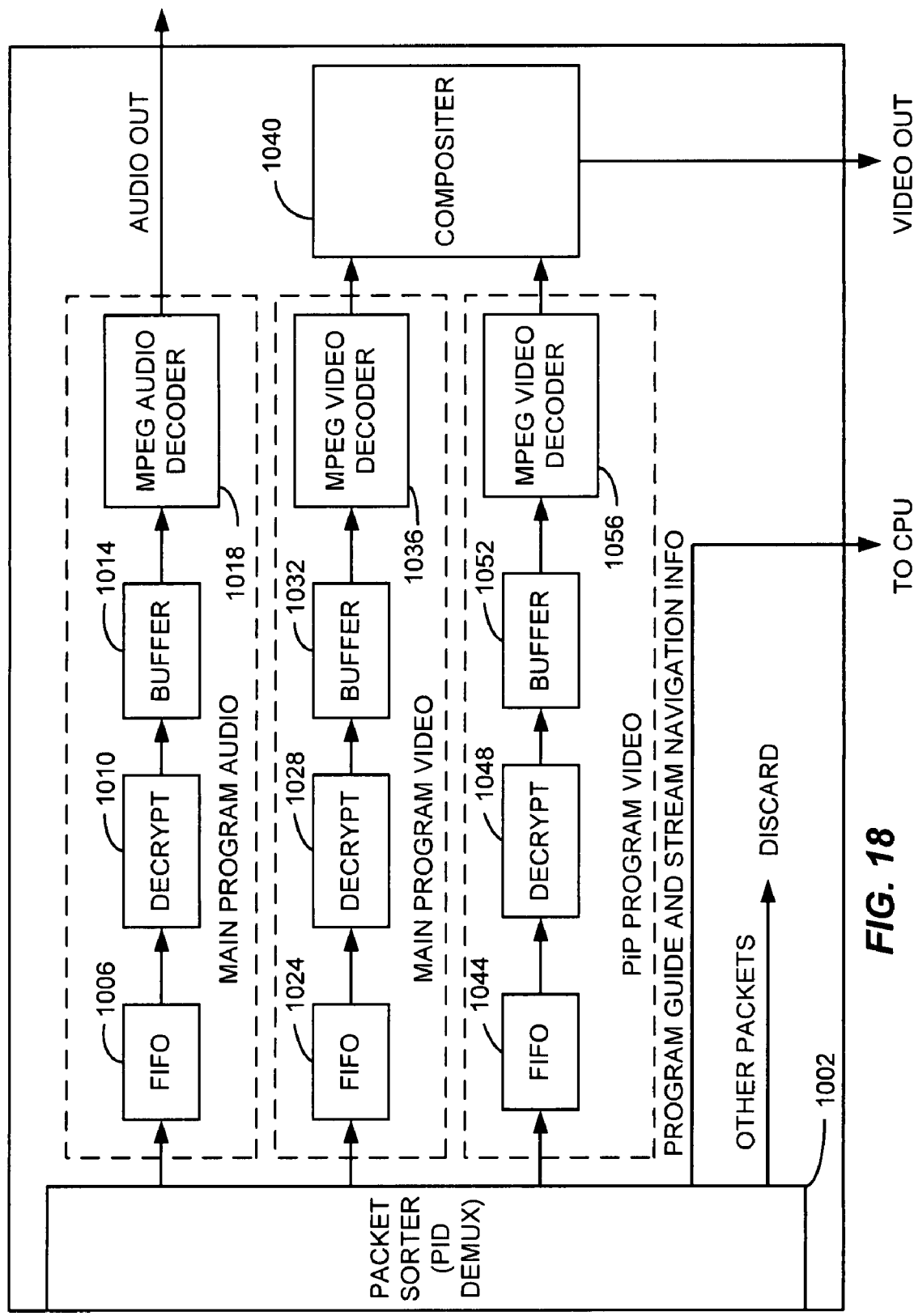
FIG. 18 is a block diagram of an exemplary decoder chip that can be utilized in a television set-top box consistent with the present invention.

The function described above in connection with FIG. 17 can be integrated into an A/V decoder chip that functions similar to that of the commercially available Broadcom series 70xx or 71xx decoder used in commercial set-top boxes. FIG. 18 illustrates a block diagram for such a decoder chip where the functions already provided in the commercial chip are essentially unchanged. Normally, commercial decoder chips expect there to be a one-to-one correspondence between the PIDs and program components (e.g., audio or video).

The decoder illustrated in FIG. 18 permits multiple PIDs to be programmed into the decoder via a connection to the STB central processor so that both primary and secondary PIDs can be handled for main audio, main video and a secondary video used for picture-in-picture (PiP) functions. In this embodiment, the raw data stream is received by a Packet sorter 1002 that provides a function similar to that described in connection with FIG. 17 above to demultiplex the stream of packets based upon PID. Preferably, the decoder of FIG. 18 carries out the PID sorting function of 1002 using hard wired logic circuitry rather than programmed software. Program guide and stream navigation information is output for use by an STB's main processor, for example. The packets associated with the main audio program are buffered in a FIFO 1006, decrypted in a decrypter 1010 and then buffered at 1014 for retrieval by an MPEG audio decoder 1018 as needed. Decoded MPEG audio is then provided as an output from the decoder.

In a similar manner, packets associated with the main video program are buffered in a FIFO 1024, decrypted in a decrypter 1028 and then buffered at 1032 for retrieval by an MPEG video decoder 1036 as needed. Decoded MPEG video for the main channel is then provided to a compositer 1040 and then provided as an output from the decoder. Similarly, packets associated with picture-in-picture video are buffered in a FIFO 1044, decrypted in a decrypter 1048 and then buffered at 1052 for retrieval by an MPEG video decoder 1056 as needed. Decoded MPEG video for the picture-in-picture channel is then provided to the compositer 1040 where it is combined with the main channel video and then provided as a decoded video output from the decoder. Other packets not associated with the main or picture-in-picture channel are discarded. Of course, other functions may be incorporated in the decoder chip or deleted without departing from embodiments of the present invention.

CONCLUSION

As previously mentioned, in order to thwart a persistent threat by hackers, several of the above partial encryption arrangements can be combined to further enhance security. For example, the critical packet encryption can be used in any combination with SI encryption, $M^{th}$ an N, random encryption, time slice and other techniques to further enhance security. In one embodiment, as many packets would be encrypted as bandwidth is available. The amount of encryption might depend on whether the content was a regular program or premium (such as a pay-per-view or VOD), whether it was an adult program or a regular movie, and the security level that the various cable operators feel comfortable operating. Those skilled in the art will appreciate that many other combinations are possible to further enhance the security of the encryption without departing from the present invention.

The present invention, as described above in its various embodiments, has been described in terms of a digital A/V system using MPEG 2 coding. Thus, the various packet names and protocol specifically discussed is related the MPEG 2 coding and decoding. However, those skilled in the art will appreciate that the concepts disclosed and claimed herein are not to be construed in such a limited scope. The same or analogous techniques can be used in any digital cable system without limitation to MPEG 2 protocols. Moreover, the present techniques can be used in any other suitable content delivery scenario including, but not limited to, terrestrial broadcast based content delivery systems, Internet based content delivery, satellite based content delivery systems such as, for example, the Digital Satellite Service (DSS) such as that used in the DirecTV™ system, as well as package media (e.g. CDs and DVDs). These various alternatives are considered equivalent for purposes of this document, and the exemplary MPEG 2 cable embodiment should be considered to be an exemplary embodiment presented for illustrative purposes.

In addition, the present invention has been described in terms of decoding partially encrypted television programs using a television set-top box. However, the present decoding mechanism can equally be implemented within a television receiver without need for an STB, or music player such as an MP3 player. Such embodiments are considered equivalent.

Also, while the present invention has been described in terms of the use of the encryption techniques described to provide a mechanism for dual partial encryption of a television program, these partial encryption techniques could be used as a single encryption technique or for multiple encryption under more than two encryption systems without limitation. More than two encryption systems would be accommodated with additional duplicated packets that are encrypted. Alternatively, the encryption key for one of the duplicated packets may be shared amongst the multiple encryption systems. Additionally, although specifically disclosed for the purpose of encryption of television programming, the present inventions can be utilized for single or dual encryption of other content including, but not limited to content for download over the Internet or other network, music content, packaged media content as well as other types of information content. Such content may be played on any number of playback devices including but not limited to personal digital assistants (PDAs), personal computers, personal music players, audio systems, audio/video systems, etc. without departing from the present invention.

Those skilled in the art will recognize that the present invention has been described in terms of exemplary embodiments that can be realized by use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Those skilled in the art will appreciate that the program steps and associated data used to implement the embodiments described above can be implemented using disc storage as well as other forms of storage such as for example Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention, as described in embodiments herein, can be implemented using a programmed processor executing programming instructions that are broadly described above in flow chart form that can be stored on any suitable electronic storage medium or transmitted over any suitable electronic communication medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method of encrypting a digital television signal carried out in any operative order, comprising:
   duplicating packets in the digital television signal so as to create first and second duplicate packets;
   encrypting the first duplicate packets according to a first encryption method to create first encrypted packets;
   encrypting the second duplicate packets according to a second encryption method to create second encrypted packets;
   identifying packets in the digital television signal that are of a packet type, while other packets are unencrypted and are not of the packet type;
   replacing the identified packets in the digital television signal with corresponding first and second encrypted packets to produce a multiple partially encrypted digital television signal comprising the other packets that are unencrypted and the first and second encrypted packets; and
   distributing the multiple partially encrypted digital television signal.

2. The method according to claim 1, further comprising distributing the partially multiple encrypted digital television signal over a cable television system.

3. The method according to claim 2, wherein the multiple partially encrypted television signal is distributed over an electronic transmission medium.

4. The method according to claim 1, wherein the packet type comprises a packet carrying information that is needed to decode the digital television signal.

5. The method according to claim 4, further comprising:
   selecting packets according to a second selection criteria; duplicating the selected packets to create first and second duplicate packets; encrypting the first duplicate packets according to the first encryption method to create the first encrypted packets; and
   encrypting the second duplicate packets according to the second encryption method to create the second encrypted packets.

6. The method according to claim 1, wherein the digital television signal complies with an MPEG standard, and wherein the packet type comprises packets carrying a payload that comprises a packetized elementary stream (PES) header.

7. The method according to claim 1, wherein the digital television signal complies with the digital satellite service transport standard, and wherein the packet type comprises packets carrying a payload of a packetized elementary stream header.

8. The method according to claim 1, wherein the packet type comprises video packets carrying a payload of a video sequence header.

9. The method according to claim 1, wherein the packet type comprises video packets carrying a payload of a group of pictures header.

10. The method according to claim 1, wherein the packet type comprises video packets carrying a payload of closed captioning information.

11. The method according to claim 1, further comprising assigning a packet identifier to the unencrypted packets.

12. The method according to claim 11, wherein the packet identifier comprises a primary packet identifier; and further comprising assigning the primary packet identifier to the first encrypted packets and assigning a secondary packed identifier to the second encrypted packets.

13. The method according to claim 11, wherein the packet identifier comprises a primary packet identifier; and further comprising assigning the primary packet identifier to the second encrypted packets and assigning a secondary packet identifier to the first encrypted packets.

14. A tangible computer readable electronic storage medium storing instructions which, when executed on a programmed processor, carry out the method of encrypting a television signal according to claim 1.

15. The method according to claim 1, wherein the television signal is compressed, and wherein the packet type comprises a packet carrying information that is needed to decompress the television signal.

16. A method of multiple partial encrypting a packetized stream of information carried out in any operative order, comprising:
  duplicating packets in the digital television signal so as to create first and second duplicate packets;
  examining packets of data in the stream of information to identify a packet type, wherein the packet type is needed to decode the data stream;
  at a first encrypting device, encrypting the first duplicate packets according to a first encryption method to create first encrypted packets
  at a second encrypting device, encrypting the second duplicate packets according to a second encryption method to create second encrypted packets;
  identifying packets in the digital television signal that are of a packet type, while other packets are unencrypted and are not of the packet type;
  replacing the identified packets in the digital television signal with corresponding first and second encrypted packets to produce a multiple partially encrypted digital television signal comprising the other packets that are unencrypted and the first and second encrypted packets; and
  sending the first and second encrypted packets along with packets of data in the stream of information that are not of the identified packet type to a recipient.

17. The method according to claim 16, wherein the stream of information represents a television program and wherein each encrypting comprises encrypting packets identified as packets that are needed to decode the television program.

18. The method according to claim 17, wherein the television program is compressed, and wherein the predetermined packet type comprises a packet type that is needed to decompress the television program.

19. The method according to claim 17, wherein the television program complies with an MPEG standard, and wherein the predetermined packet type is identified as transport stream packet carrying a payload that comprises a packetized elementary stream (PES) header.

20. The method according to claim 17, wherein the television program complies with an MPEG standard, and wherein the predetermined packet type is identified as a packet containing MPEG I-picture packets.

21. The method according to claim 17, wherein the television program complies with a digital satellite service transport standard, and wherein the predetermined packet type comprises packets carrying a payload of a packetized elementary stream header.

22. The method according to claim 17, wherein the packet type comprises video packets carrying a payload of a video sequence header.

23. The method according to claim 17, wherein the packet type comprises video packets carrying a payload of a group of pictures header.

24. The method according to claim 17, wherein the packet type comprises video packets carrying a payload of closed captioning information.

25. A tangible computer readable electronic storage medium storing instructions which, when executed on a programmed processor, carry out the method of encrypting a packetized stream of information according to claim 16.

* * * * *

UNITED STATES PATENT AND TRADEMARK OFFICE
CERTIFICATE OF CORRECTION

| | | |
|---|---|---|
| PATENT NO. | : 7,760,879 B2 | Page 1 of 1 |
| APPLICATION NO. | : 11/983296 | |
| DATED | : July 20, 2010 | |
| INVENTOR(S) | : Unger et al. | |

It is certified that error appears in the above-identified patent and that said Letters Patent is hereby corrected as shown below:

In The Specifications:

In column 6, line 37, delete "AN" and insert -- A/V -- therefor.

In column 6, line 59, delete "Si" and insert -- SI -- therefor.

In column 11, line 50, delete "Si" and insert -- SI -- therefor.

In column 17, line 17, delete "wilt" and insert -- will -- therefor.

In column 18, line 36, delete "AN" and insert -- A/V -- therefor.

In column 22, line 11, delete "AN" and insert -- A/V -- therefor.

In column 29, line 37, delete "transport priority" and insert -- transport_priority -- therefor.

Signed and Sealed this
Eighteenth Day of January, 2011

David J. Kappos
*Director of the United States Patent and Trademark Office*